(12) United States Patent
Guo et al.

(10) Patent No.: US 10,970,004 B2
(45) Date of Patent: Apr. 6, 2021

(54) METHOD AND APPARATUS FOR USB PERIODIC SCHEDULING OPTIMIZATION

(71) Applicant: Synopsys, Inc., Mountain View, CA (US)

(72) Inventors: Shaori Guo, San Jose, CA (US); Jun Cao, Los Gatos, CA (US); Jigang Yang, Irvine, CA (US); Subramaniam Aravindhan, Redwood City, CA (US); Saleem Mohammad, Fremont, CA (US); Chandrashekar B U, Bengaluru (IN)

(73) Assignee: Synopsys, Inc., Mountain View, CA (US)

(*) Notice: Subject to any disclaimer, the term of this patent is extended or adjusted under 35 U.S.C. 154(b) by 0 days.

(21) Appl. No.: 16/723,093

(22) Filed: Dec. 20, 2019

(65) Prior Publication Data

US 2020/0201800 A1    Jun. 25, 2020

(30) Foreign Application Priority Data

Dec. 21, 2018 (IN) .............................. 201811048587

(51) Int. Cl.
*G06F 3/06* (2006.01)
*G06F 13/38* (2006.01)
(Continued)

(52) U.S. Cl.
CPC ........ *G06F 3/0659* (2013.01); *G06F 13/1626* (2013.01); *G06F 13/387* (2013.01);
(Continued)

(58) Field of Classification Search
CPC .... G06F 3/0655; G06F 3/0659; G06F 9/3836; G06F 9/4881; G06F 9/5038;
(Continued)

(56) References Cited

U.S. PATENT DOCUMENTS

| 2003/0005197 A1* | 1/2003 | Abramson | ............ | G06F 13/387 |
| | | | | 710/300 |
| 2003/0079061 A1* | 4/2003 | Azzarito | ............... | G06F 13/385 |
| | | | | 710/5 |

(Continued)

OTHER PUBLICATIONS

"Universal Serial Bus 3.2 Specification". 2017. USB 3.0 Promoter Group. Sections 8.12.6-8.12.6.7. pp. 299-312 (Year: 2017).*

*Primary Examiner* — Thomas J. Cleary
(74) *Attorney, Agent, or Firm* — Sterne, Kessler, Goldstein & Fox P.L.L.C.

(57) ABSTRACT

A computerized system is disclosed. The computerized system may include one or more processors configured to perform the operations stored in a memory. The operations may include sorting a subset of a plurality of endpoints for communication during a communication frame first based on service interval time assigned to each endpoint and then resorting based on a concurrency score of each peripheral device corresponding to the subset of the plurality of endpoints. The operations may include determining available bandwidth and a number of packets to be communicated with the each endpoint of the subset of the plurality of endpoints. The operations may include generating a scheduling table that includes the number of packets and an order of communication of the packets to be communicated with the each endpoint of the subset of the plurality of endpoints.

20 Claims, 15 Drawing Sheets

(51) Int. Cl.
*H04L 12/24* (2006.01)
*G06F 13/16* (2006.01)

(52) U.S. Cl.
CPC .. H04L 41/0896 (2013.01); *G06F 2003/0697* (2013.01); *G06F 2213/0042* (2013.01)

(58) Field of Classification Search
CPC .............. G06F 13/161; G06F 13/1615; G06F 13/1626; G06F 13/387; G06F 13/4282; G06F 2213/0042; G06F 2003/0697; H04L 41/0896
See application file for complete search history.

(56) References Cited

U.S. PATENT DOCUMENTS

| | | | |
|---|---|---|---|
| 2011/0208892 A1* | 8/2011 | Meyers | G06F 13/4226 710/313 |
| 2013/0326091 A1* | 12/2013 | Chen | G06F 13/105 710/8 |
| 2014/0136748 A1* | 5/2014 | Por | G06F 13/28 710/308 |
| 2016/0350247 A1* | 12/2016 | Howard | G06F 13/4063 |
| 2017/0024344 A1* | 1/2017 | Shetty | G06F 13/4282 |
| 2018/0239728 A1* | 8/2018 | Emerson | G06F 13/28 |
| 2019/0042523 A1* | 2/2019 | Ismail | G06F 13/385 |

* cited by examiner

METHOD AND APPARATUS FOR USB PERIODIC SCHEDULING OPTIMIZATION

CROSS-REFERENCE TO RELATED APPLICATIONS

The present application claims the benefit of Indian Patent Appl. No. 201811048587, filed on Dec. 21, 2018, which is incorporated herein by reference in its entirety for all purposes.

COPYRIGHT NOTICE

The assignee of this patent document has no objection to the facsimile reproduction by anyone of the patent document itself, or of the patent application, as it appears in the files of the United States Patent and Trademark Office, but otherwise reserves all rights whatsoever in any included works of authorship protected by copyright.

SPECIFICATION—DISCLAIMERS

In the following Background, Summary, and Detailed Description, paragraph headings do not signify limitations. In these writings, the citation or identification of any publication signifies neither relevance nor status as prior art. Many paragraphs in this disclosure are common to multiple Synopsys patent specifications.

FIELD(S) OF TECHNOLOGY

The following information is solely for use in searching the prior art. This disclosure has significance in the field of electronics in general, including the following topics: electronic design automation, universal serial bus (USB) scheduling, and USB periodic scheduling.

BACKGROUND

USB is a widely used interconnect standard. A USB system consists of a USB host, and one or more USB peripherals. A USB peripheral can be a USB device or a USB hub. The USB host is responsible for initiating all data transfers in the USB system. Each USB peripheral has one or more endpoints used for data transfers. The one or more endpoints on the USB peripheral are hardware based. An endpoint on the USB host is software based. The USB host can send data to an OUT endpoint of a USB peripheral that is generally referenced as a data sink. The USB host can receive data from an IN endpoint of a USB peripheral that is generally referenced as a data source.

IN and OUT endpoints are further divided into two categories: periodic endpoints and non-periodic endpoints. These two types of endpoints have different scheduling requirements for the USB host. Periodic endpoints require the host to schedule transfers periodically within a specified time interval, but non-periodic endpoints do not have such a constraint; they receive or send data at the best effort of the host. In other words, the host sends or receives data from a non-periodic endpoint whenever there is USB bus bandwidth available.

The USB host performs scheduling to meet requirements of periodic endpoints according to bandwidth requirements of the periodic endpoints. Accordingly, USB bus utilization and overall USB system performance is largely dependent on the efficiency of USB periodic scheduling. In addition, the latest USB standard USB3.2 supports four (4) more high data rates along with speeds supported by USB2.0 standard. The four new high data rates in USB3.2 standard are five (5) Giga bits per second (Gbps) for Gen 1x1, ten (10) Gbps for Gen2x1, 2x5 Gbps for Gen1x2, and 20 Gbps for Gen2x2. Due to high data rates supported by USB3.2 standard, any inefficient resulted from the host periodic scheduling leads to loss of the data throughput and the degradation of the USB system performance.

SUMMARY

This Summary is a prelude to the Detailed Description. This Summary, together with the independent Claims, signifies a brief writing about at least one claimed invention (which can be a discovery, see 35 USC 100(a); and see 35 USC 100(j)), for use in commerce that is enabled by the Specification and Drawings.

The claims signify a brief description of one or more of the innovations, embodiments, and/or examples found within this disclosure.

This disclosure describes a computerized system for USB periodic scheduling optimization. The computerized system may include a memory configured to store operations, and one or more processors configured to perform the operations including sorting a subset of a plurality of endpoints for communication during a communication frame. The subset of the plurality of endpoints may be sorted based on a value of service interval assigned to each endpoint of the subset of the plurality of endpoints. The plurality of endpoints may include one or more endpoints of a first peripheral device and one or more endpoints of a second peripheral device. The operations may further include re-sorting the sorted subset of the plurality of endpoints based on a concurrency score of the first peripheral device with the second peripheral device. The operations may also include determining available bandwidth for communication with the each endpoint of the subset of the plurality of endpoints. The operations may further include determining a number of packets to be communicated with the each endpoint of the subset of the plurality of endpoints based on the determined available bandwidth and generating a scheduling table for communicating the number of packets with the each endpoint of the subset of the plurality of endpoints based on the concurrency score of the first peripheral device with the second peripheral device. The generated scheduling table may include the number of packets to be communicated with the each endpoint of the subset of the plurality of endpoints and an order of communication of the number of packets to be communicated with the each endpoint of the subset of the plurality of endpoints.

This disclosure also describes a method for USB periodic scheduling optimization. The method may include sorting a subset of a plurality of endpoints for communication during a communication frame. The subset of the plurality of endpoints may be sorted based on a value of service interval assigned to each endpoint of the subset of the plurality of endpoints. The plurality of endpoints may include one or more endpoints of a first peripheral device and one or more endpoints of a second peripheral device. The method may further include re-sorting the sorted subset of the plurality of endpoints based on a concurrency score of the first peripheral device with the second peripheral device. The method may also include determining available bandwidth for communication with the each endpoint of the subset of the plurality of endpoints. The method may further include determining a number of packets to be communicated with the each endpoint of the subset of the plurality of endpoints based on the determined available bandwidth and generating a scheduling table for communicating the number of packets with the each endpoint of the subset of the plurality of endpoints based on the concurrency score of the first peripheral device with the second peripheral device. The generated scheduling table may include the number of packets to be communicated with the each endpoint of the subset of the plurality of endpoints and an order of communication of the number of packets to be communicated with the each endpoint of the subset of the plurality of endpoints.

This disclosure also describes a non-transitory computer-readable device having instructions stored thereon that, when executed by at least one computing device, causes the at least one computing device to perform operations including sorting a subset of a plurality of endpoints for communication during a communication frame. The subset of the plurality of endpoints may be sorted based on a value of service interval assigned to each endpoint of the subset of the plurality of endpoints. The plurality of endpoints may include one or more endpoints of a first peripheral device and one or more endpoints of a second peripheral device. The operations may further include re-sorting the sorted subset of the plurality of endpoints based on a concurrency score of the first peripheral device with the second peripheral device. The operations may also include determining available bandwidth for communication with the each endpoint of the subset of the plurality of endpoints. The operations may further include determining a number of packets to be communicated with the each endpoint of the subset of the plurality of endpoints based on the determined available bandwidth and generating a scheduling table for communicating the number of packets with the each endpoint of the subset of the plurality of endpoints based on the concurrency score of the first peripheral device with the second peripheral device.

This Summary does not completely signify the claimed inventions. This Summary (as well as the Abstract) neither signifies essential elements of, nor limits the scope of, the claimed inventions enabled by the Specification and Figures.

DRAWINGS

The following Detailed Description, Figures, and Claims signify the uses and advantages of the claimed inventions, and their embodiments. All of the Figures are used only to provide knowledge and understanding and do not limit the scope of the claimed inventions and their embodiments. Such Figures are not necessarily drawn to scale.

Similar components or features used in the Figures can have the same, or similar, reference signs in the form of labels (such as alphanumeric symbols, e.g., reference numerals), and can signify a similar or equivalent use. Further, various components of the same type can be distinguished by following the reference label by a dash and a second label that distinguishes among the similar components. If only the first reference label is used in the Specification, its use applies to any similar component having the same first reference label irrespective of the second reference label. A brief description of the Figures is below.

Figure 1:
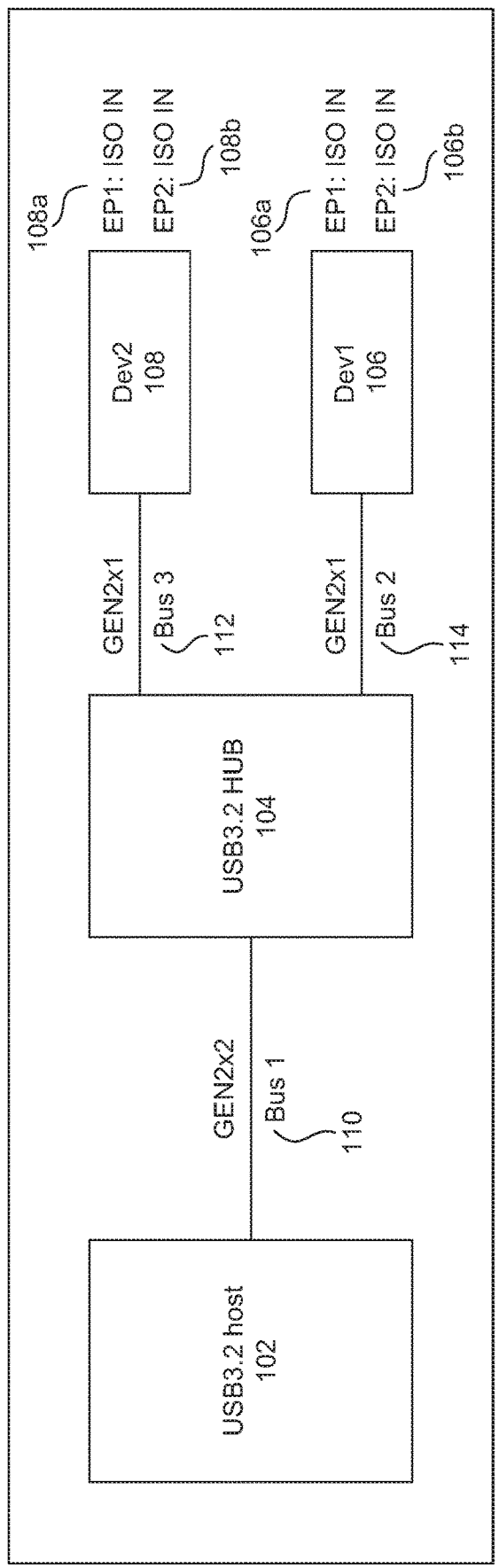
FIG. 1 illustrates a USB3.2 network topology, according to an exemplary embodiment of the present disclosure.

In the Figures, reference signs can be omitted as is consistent with accepted engineering practice; however, a skilled person will understand that the illustrated components are readily understood when viewed in the context of the illustration as a whole and the accompanying disclosure describing such various figures.

DETAILED DESCRIPTION

The Figures and Detailed Description signify, only to provide knowledge and understanding, the claimed inventions. To minimize the length of the Detailed Description, while various features, structures or characteristics can be described together in a single embodiment, they also can be used in other embodiments without being written about. Variations of any of these elements, and modules, processes, machines, systems, manufactures or compositions disclosed by such embodiments and/or examples are easily used in commerce. The Figures and Detailed Description also can signify, implicitly or explicitly, advantages and improvements of the claimed inventions and their embodiments for use in commerce.

In the Figures and Detailed Description, numerous specific details can be described to enable at least one embodiment of the claimed inventions. Any embodiment disclosed herein signifies a tangible form of a claim invention. To not obscure the significance of the embodiments and/or examples in this Detailed Description, some elements that are known to a skilled person can be combined together for presentation and for illustration purposes and not be described in detail. To not obscure the significance of these embodiments and/or examples, some well-known processes, machines, systems, manufactures or compositions are not written about in detail. However, a skilled person can use these embodiments and/or examples in commerce without these specific details or their equivalents. Thus, the Detailed Description focuses on enabling the distinctive elements of the claimed inventions and exemplary embodiments. Where this Detailed Description refers to some elements in the singular tense, more than one element can be depicted in the Figures and like elements are labeled with like numerals.

Detailed Description—a Simple USB 3.2 Network Topology

USB3.2 is the latest USB standard that supports four new high speed data rates, namely 5 Giga bits per second for Gen 1x1, 10 Giga bits per second for Gen2x1, 2x5 Giga bits per second for Gen1x2 and 20 Giga bits per second for Gen2x2. A USB network comprises a USB host and one or more USB peripheral devices. A USB peripheral device may be USB devices or a USB hub. The peripheral device may have a plurality of endpoints. An endpoint of the peripheral device may be an OUT endpoint or an IN endpoint. The USB host sends data to the OUT endpoint, also referenced in this disclosure as a data sink, of the USB peripheral device and receives data from the IN endpoint, also referenced in this disclosure as a data source, of the USB peripheral device. In other words, the USB host is responsible for initiating all data transfers in the USB network.

The IN and OUT endpoints may be either periodic endpoints or non-periodic endpoints. The USB host may need to satisfy scheduling requirements for the periodic and non-periodic endpoints differently. Periodic endpoints require the USB host to schedule transfers periodically with a specified time interval. However, non-periodic endpoints do not require the USB host to schedule periodic transfers rather only require that they receive or send data at the best effort of the USB host.

Periodic scheduling is a process in which for every micro frame, the USB host determines an ordered list of periodic endpoints. A successful periodic scheduling by the USB host must meet the following two requirements. First, all the periodic endpoints need to be served within the endpoint service interval time (ESIT) with a maximum ESIT payload. Second, USB bus bandwidth limit should not be exceeded.

FIG. 1 illustrates a USB3.2 network topology, according to an exemplary embodiment of the present disclosure. In some embodiments, A USB3.2 host 102 and USB peripheral devices such as a USB3.2 hub 104, a first peripheral device Dev1 106, and a second peripheral device Dev2 108 are shown in FIG. 1. The first peripheral device Dev1 106 has two isochronous IN endpoints EP1 106a and EP2 106b. Similarly, the second peripheral device Dev2 108 has two isochronous IN endpoints EP1 108a and EP2 108b. The USB peripheral devices such as the USB3.2 hub 104, the first peripheral device Dev1 106, and the second peripheral device Dev2 108 are communicatively coupled with each other via one or more buses. For example, the USB3.2 hub 104 is communicatively coupled with the USB3.2 host 102 via a bus Bus1 110. The first peripheral device Dev1 106 and the second peripheral device Dev2 108 are communicatively coupled with the USB3.2 hub 104 via a bus Bus2 114 and a bus Bus3 112 respectively. The buses Bus1 110, Bus2 114, and Bus3 112 may each support one of the high speed data rate described above. By way of non-limiting example, the bus Bus1 110 is of type GEN2x2 that supports 20 Gbps data speed and the buses Bus2 114 and Bus3 112 each is of type Gen2X1 that supports 10 Gbps data speed. Further, by way of non-limiting example, service interval time for the two isochronous IN endpoints EP1 106a and EP2 106b of the first peripheral device Dev1 106 and the two isochronous IN endpoints EP1 108a and EP2 108b of the second peripheral device Dev 108 may be zero (0), i.e., the IN endpoints 106a, 106b, 108a, and 108b are required to be served in every micro frame. As described in "eXtensible Host Controller Interface for Universal Serial Bus (xHCI)," revision 1.1, which is incorporated herein by reference in its entirety for all purposes, the IN endpoints 106a, 106b, 108a, and 108b may be configured for number of bytes allowed for transfer during a micro frame based on "max burst size" and "mult" fields' values. While FIG. 1 shows a USB3.2 system and various embodiments are described herein with respect to the USB3.2 system, various embodiments as described herein may also be applied to USB system according to other USB standards and/or other types of network for scheduling and optimization.

Figure 2:
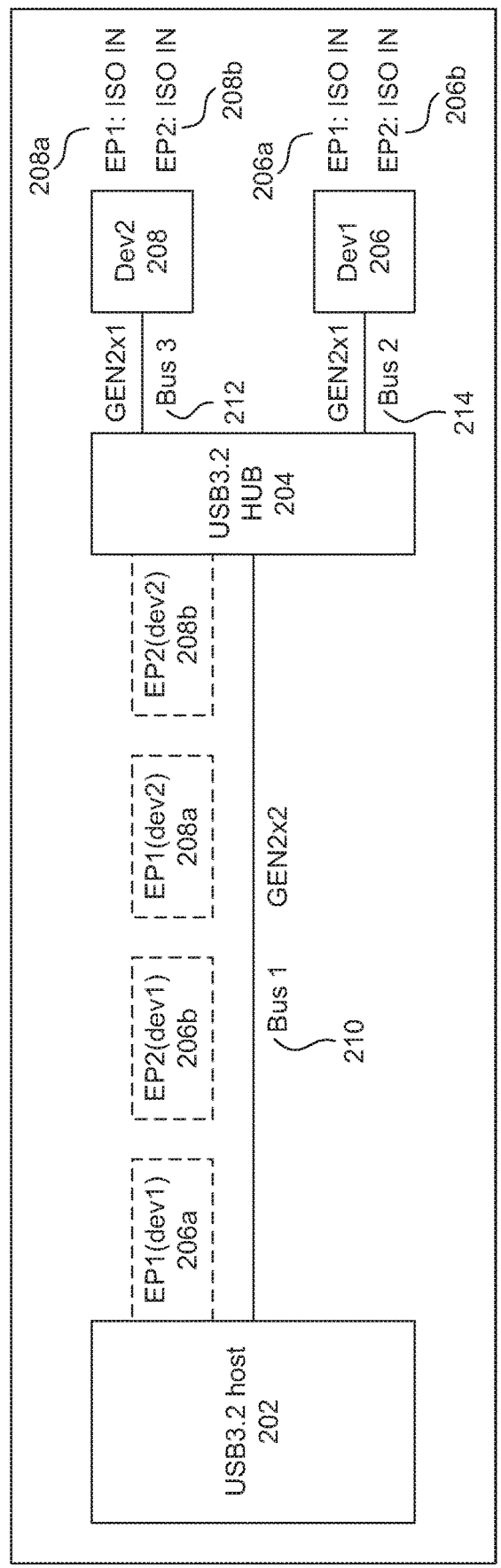
FIG. 2 illustrates sequential data transfers, according to an exemplary embodiment of the present disclosure.

FIG. 2 illustrates sequential data transfers, according to an exemplary embodiment of the present disclosure. As described above, the USB host is responsible for initiating and scheduling data transfers in the USB system. In some embodiments, by way of non-limiting example, a USB3.2 host 202 and a USB3.2 hub 204 are communicatively coupled with each other via a GEN2x2 USB bus Bus1 210, which supports high speed data rate of 20 Gbps. A first peripheral device Dev1 206 with two isochronous IN endpoints EP1 206a and EP2 206b and a second peripheral device Dev2 208 with two isochronous IN endpoints EP1 208a and EP2 208b are shown. The first peripheral device Dev1 206 and the second peripheral device Dev2 208 are each communicatively coupled with the USB3.2 hub 204 via a GEN2x1 bus Bus2 214 and a GEN2x1 bus Bus3 212 respectively. By way of non-limiting example, the USB3.2 host 202 may schedule the IN data transfer in the following order: EP1 206a, EP2 206b, EP1 208a, EP2 208b. When the USB3.2 host 202 schedules IN data transfer according to the above described order, as shown in FIG. 2, there would be gaps between two consecutive data transfers. The gaps between the two consecutive data transfer bursts occur because the bus Bus1 210 is twice as fast as the buses Bus2 214 and Bus3 212 each and because of the scheduling order as described above. It is clear as can be seen from the FIG. 2 that scheduling of the IN data transfer according to an order as may result in an inefficient bandwidth usage of the USB system.

Figure 3:
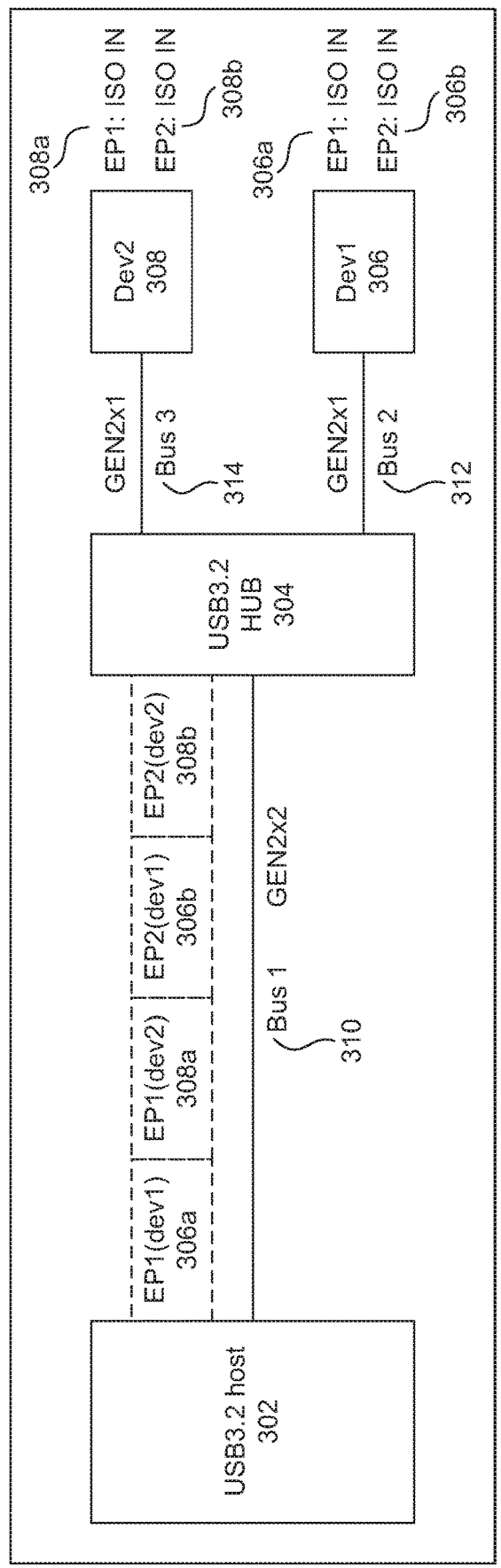
FIG. 3 illustrates concurrent data transfers, according to an exemplary embodiment of the present disclosure.

FIG. 3 illustrates concurrent data transfers, according to an exemplary embodiment of the present disclosure. In some embodiments, by way of non-limiting example, a USB3.2 host 302 and a USB3.2 hub 304 are communicatively coupled with each other via a GEN2x2 USB bus Bus1 310, which supports high speed data rate of 20 Gbps. A first peripheral device Dev1 306 with two isochronous IN endpoints EP1 306a and EP2 306b and a second peripheral device Dev2 308 with two isochronous IN endpoints EP1 308a and EP2 308b are shown. The first peripheral device Dev1 306 and the second peripheral device Dev2 308 are each communicatively coupled with the USB3.2 hub 304 via a GEN2x1 bus Bus2 312 and a GEN2x1 bus Bus3 314 respectively. By way of non-limiting example, the USB3.2 host 302 may schedule the IN data transfer in the following order: EP1 206a, EP1 208a, EP2 206b, EP2 208b. When the USB3.2 host 202 schedules IN data transfer according to the above described order, as shown in FIG. 3, there would be no gap between two consecutive data transfers if the USB3.2 host 302 supports at least four (4) outstanding IN transfers. Thus, scheduling of the IN data transfer according to an order as described with reference to FIG. 3 may result in an efficient bandwidth usage of the USB system in comparison with the IN data transfer according to an order as described with reference to FIG. 2.

Figure 4:
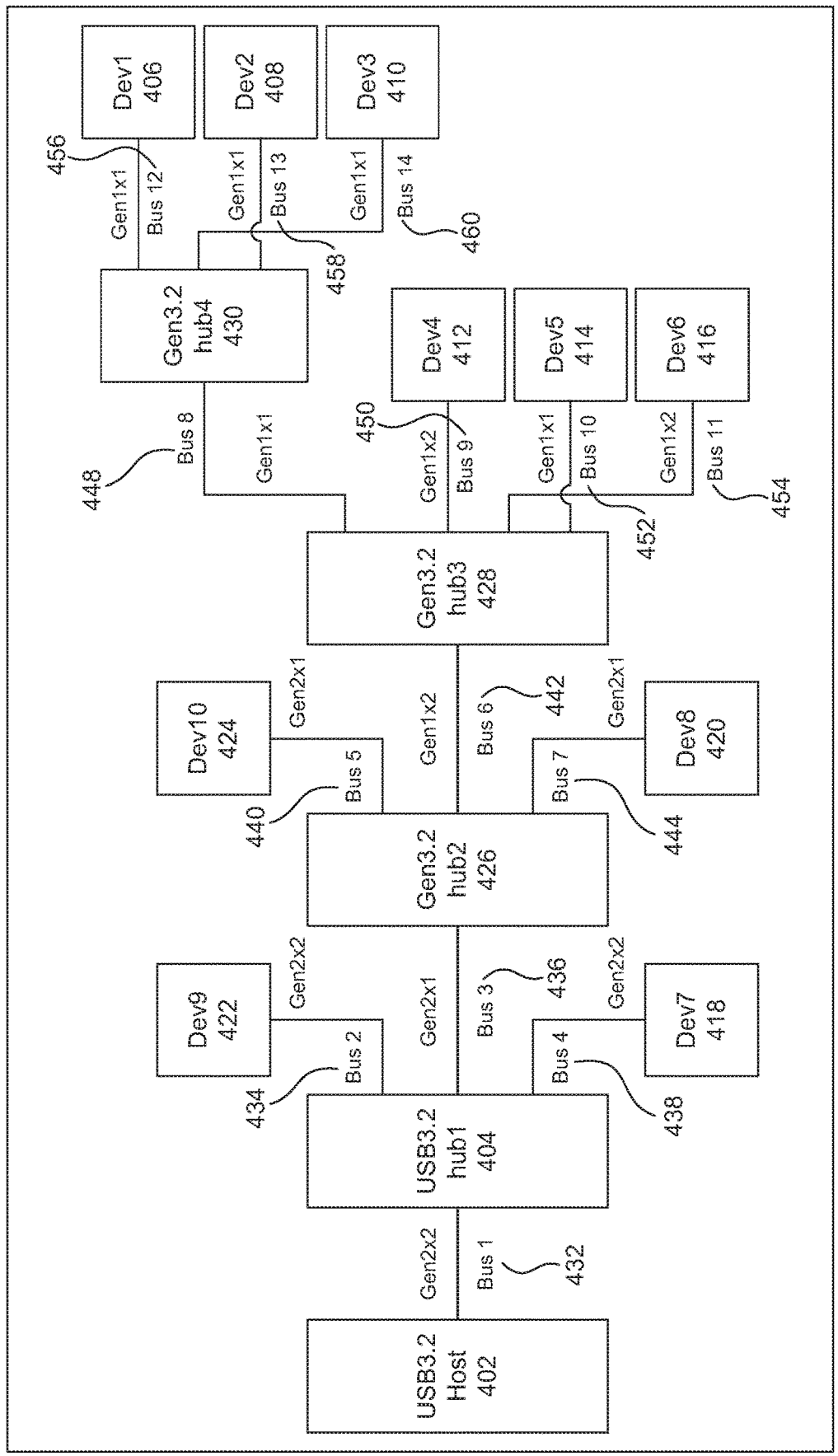
FIG. 4 illustrates a USB3.2 network topology, according to an exemplary embodiment of the present disclosure.

Detailed Description—Scheduling Optimization for a USB 3.2 Network Topology—Bandwidth Domains FIG. 4 illustrates a USB3.2 network topology, according to an exemplary embodiment of the present disclosure. The USB3.2 network as shown in FIG. 4 is complex in comparison with the USB3.2 network shown in any of the FIG. 1 through FIG. 3. In some embodiments, by way of non-limiting example, as shown in FIG. 4, the USB3.2 network may comprise a USB3.2 host 402, and a plurality of peripheral devices. The plurality of peripheral devices comprise peripheral devices Dev1 406, Dev2 408, Dev3 410, Dev4 412, Dev5 414, Dev6 416, Dev7 418, Dev8 420, Dev9 422, and Dev10 424. The plurality of peripheral devices also comprise USB3.2 hubs hub1 404, hub2 426, hub3 428, and hub4 430. The plurality of peripheral devices are communicatively coupled with each other and the USB3.2 host 402 via one or more buses such as GEN2x2 buses Bus1 432, Bus2 434, and Bus4 438; GEN2x1 buses such as Bus3 436, Bus5 440, and Bus7 444; GEN1x2 buses Bus6 442, Bus9 450 and Bus11 454; and GEN1x1 buses Bus10 452, Bus8 448, Bus12 456, Bus13 458, and Bus14 460.

In a USB3.2 network as shown in FIG. 4 above, it becomes a challenging task to schedule concurrent transfers for one or more endpoints such that all the periodic endpoints are served within the ESIT with the maximum ESIT payload and no USB bus bandwidth is being exceeded. Further, data transfer between the USB3.2 host 402 and a USB peripheral device of the plurality of USB peripheral devices shown in FIG. 4 may require multiple speed translations due to the fact that the buses that connect the USB3.2 host 402 and the USB peripheral device may support different transmission speeds. For example, for data transfers between the USB3.2 host 402 and the USB peripheral device Dev1 406 may undergo three speed translations—GEN1x1 to GEN1X2 speed translation at the hub hub3 428, GEN1x2 to GEN2x1 speed translation at the hub hub2 426, and GEN2x1 to GEN2x2 speed translation at the hub hub1 404.

In addition to several speed translations for data transfer between the USB host and the USB peripheral device, bandwidth limit for each USB bus and a large number of combinations of scheduling order add to the complexity of scheduling optimization. However, using the method as described herein, scheduling of data transfer may be optimized to improve performance of the USB system without exceeding the bus bandwidth usage of any of the buses. In other words, scheduling optimization to improve performance of the USB system is achieved by identifying which endpoints can be served concurrently.

In some embodiments, to identify whether two data transfer can be scheduled concurrently, a concept of bus bandwidth domain as described herein may be applied. A bus bandwidth domain may be defined as a bus or a set of a plurality of USB buses that starts from either a USB host root port or a downstream port of a USB hub and ends at a USB peripheral device or an upstream port of a USB hub if the upstream port of the USB hub is operating at a different transmission speed from the downstream port of the USB hub. The bus bandwidth domain concept is explained below with reference to FIG. 5.

Figure 5:
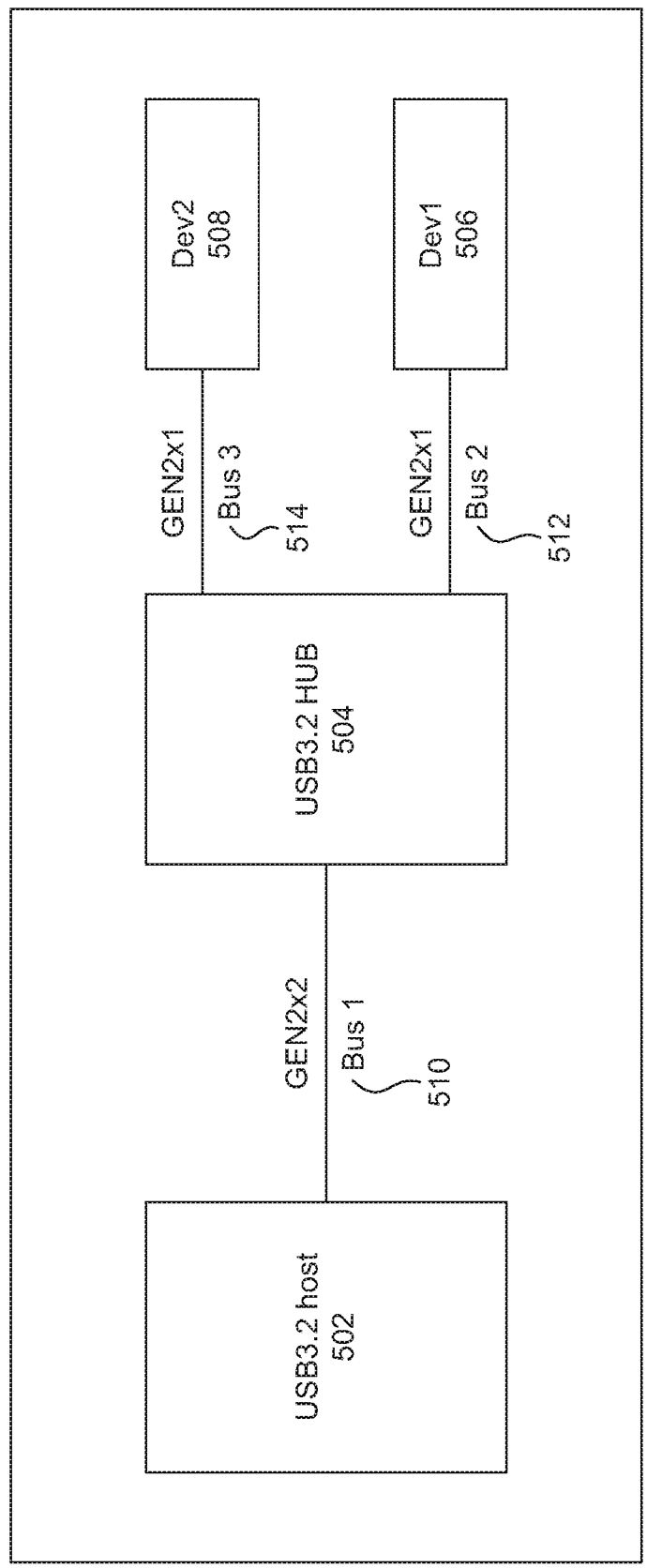
FIG. 5 illustrates bandwidth domains, according to an exemplary embodiment of the present disclosure.
Figure 6:
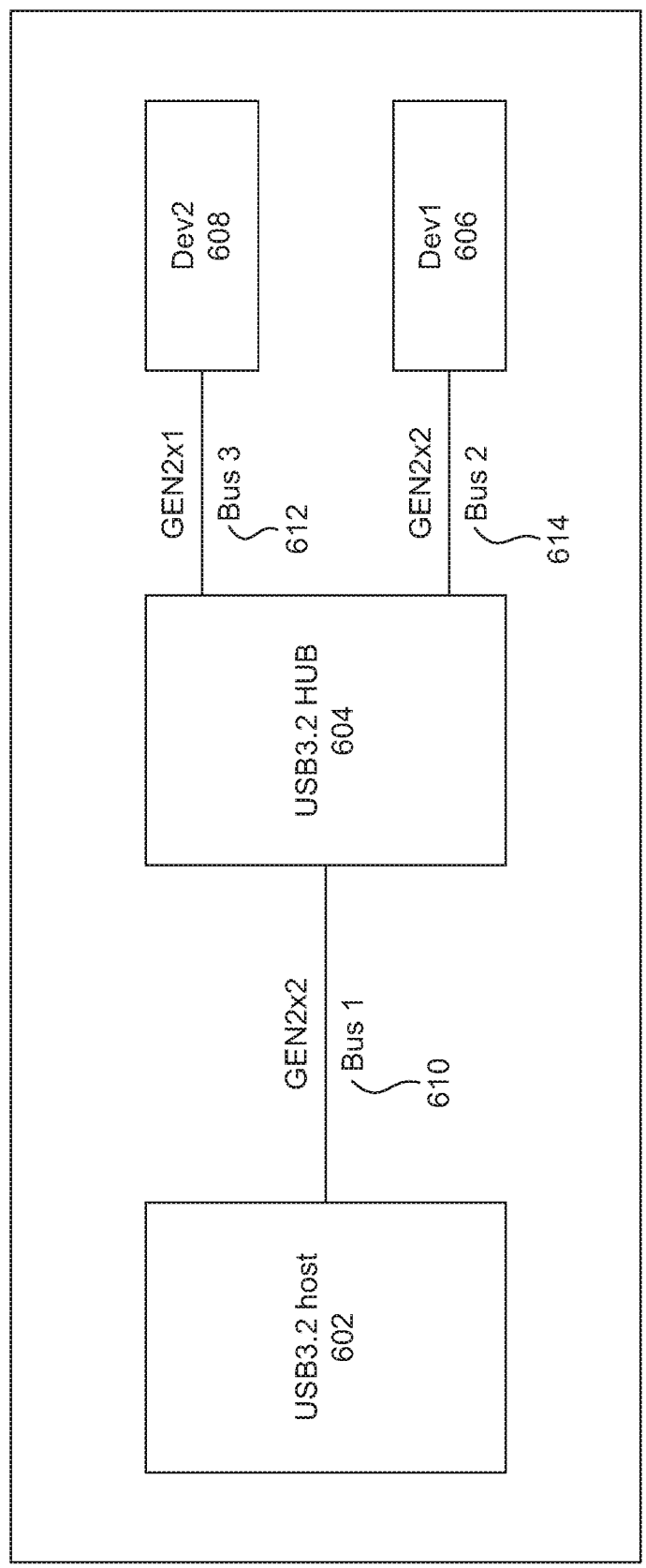
FIG. 6 illustrates bandwidth domains, according to an exemplary embodiment of the present disclosure.

FIG. 5 and FIG. 6 illustrate bandwidth domains, according to an exemplary embodiment of the present disclosure. The USB network shown in FIG. 5 is similar to USB networks as described above with reference to FIG. 1 through FIG. 3, and, therefore, is not described again. The USB network as shown in FIG. 5 has three different bus bandwidth domains. The first bus bandwidth domain starts from a host root hub port (not shown) on a USB3.2 host 502 and ends at an upstream port (not shown) on a USB3.2 hub 504. Here, the USB3.2 hub 504 has one upstream port that enables communication with the USB3.2 host 502, and two downstream ports (not shown) that enables communications of the USB3.2 hub 504 with a first peripheral device 506 and a second peripheral device 508. The transmission speed supported at the USB hub 504's downstream port and the upstream port is GEN2x1 and GEN2x2 respectively. Since the transmission supported by the USB hub 504's downstream port and the upstream port are different, as described above, the first bandwidth domain 510 that started at the USB host root port of the USB3.2 host 502 would end at the upstream port of the USB hub 504.

Accordingly, a second bus bandwidth domain starts at the downstream port of the USB3.2 hub 504 and ends at the USB peripheral device 506, and a third bus bandwidth domain starts at the other downstream port of the USB3.2 hub 504 and ends at the USB peripheral device 508. Table 1 below shows the bandwidth domains and their corresponding buses in the bandwidth domain and the peripheral devices.

TABLE 1

| Bandwidth domain | Buses in the Bandwidth Domain | USB Peripherals in the Bandwidth Domain |
|---|---|---|
| BD1 | Bus1 510 | USB3.2 hub 504 |
| BD2 | Bus2 512 | Dev1 506 |
| BD3 | Bus3 514 | Dev2 508 |

The USB network as shown in FIG. 6 is similar to similar to USB networks as described above with reference to FIG. 1 through FIG. 3, and, therefore, is not described again. However, a first USB peripheral device Dev1 606 in USB network shown in FIG. 6 is communicatively coupled with a USB3.2 hub 604 via GEX2x2 bus Bus2 614 instead of GEN2x1 bus. The USB network as shown in FIG. 6 has two different bus bandwidth domains. The first bus bandwidth domain starts from a host root hub port (not shown) on a USB3.2 host 602 and ends at the first USB peripheral device Dev1 606 because an upstream port and a downstream port of the USB3.2 hub 604 that provide communication between the USB3.2 host 602 and the first USB peripheral device Dev1 606 are operating at the same transmission speed, i.e., GEN2x2. For the USB network of FIG. 6, a second bus bandwidth domain 514 starts at another downstream port of the USB3.2 hub 604 and ends at the second USB peripheral device 608. Table 2 below shows the bandwidth domains and their corresponding buses in the bandwidth domain and the peripheral devices for the USB network of FIG. 6.

TABLE 2

| Bandwidth domain | Buses in the Bandwidth Domain | USB Peripherals in the Bandwidth Domain |
|---|---|---|
| BD1 | Bus1 610, Bus2 614 | USB3.2 hub 604, Dev1 606 |
| BD2 | Bus3 612 | Dev2 608 |

Figure 7:
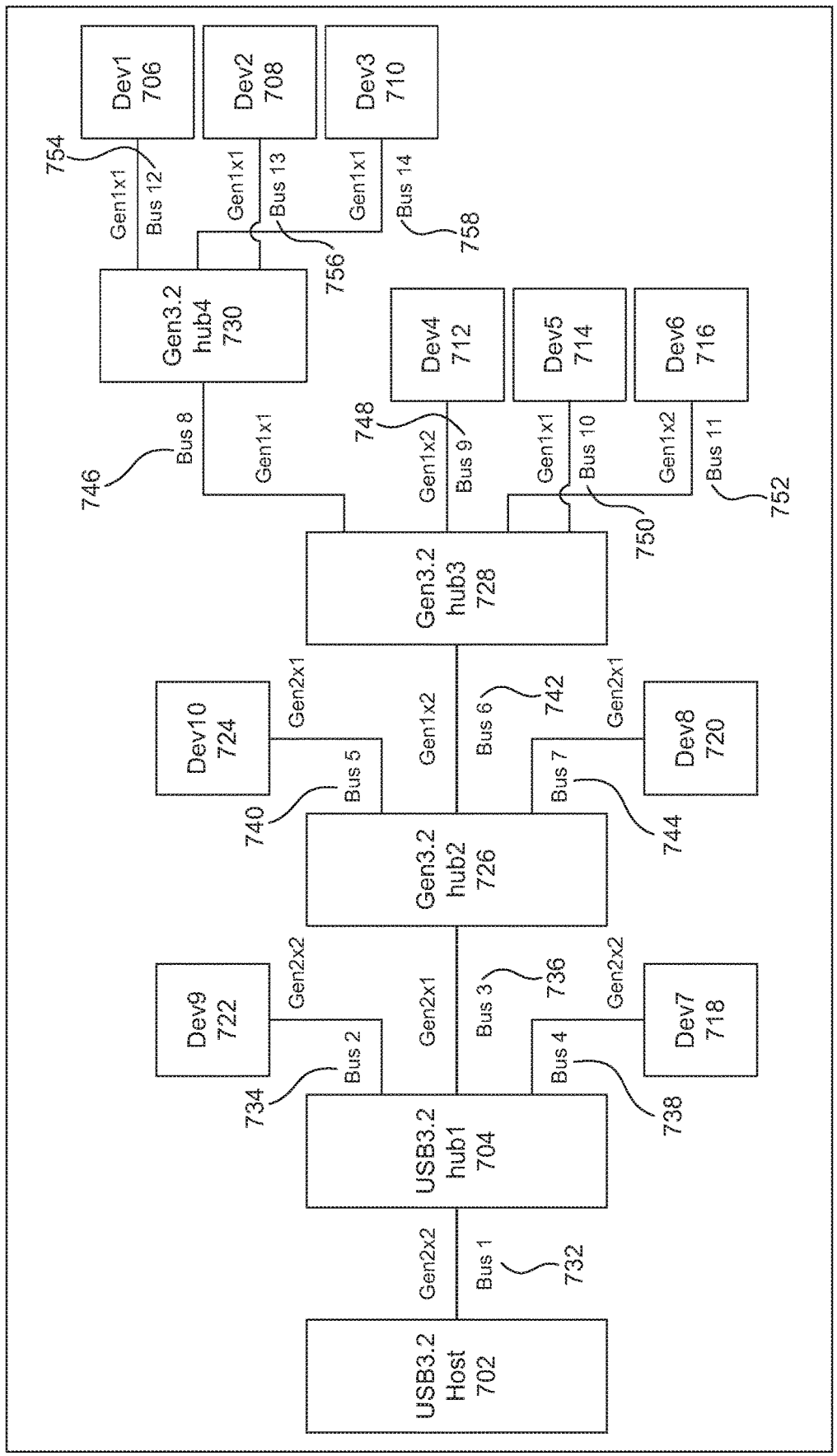
FIG. 7 illustrates bandwidth domains, according to an exemplary embodiment of the present disclosure.

Bandwidth domains for a USB network as shown in FIG. 7 are summarized in Table 3 below. The USB network as shown in FIG. 7 is identical to the USB network shown in FIG. 4. Accordingly, the USB network of FIG. 7 is not being described again.

TABLE 3

| Bandwidth domain | Buses in the Bandwidth Domain | USB Peripherals in the Bandwidth Domain |
|---|---|---|
| BD1 | Bus1 732, Bus2 734, Bus4 738 | USB3.2 hub hub1 704, Dev7 718, Dev9 722 |
| BD2 | Bus3 736, Bus5 740, Bus7 744 | USB3.2 hub hub2 726, Dev8 720, Dev10 724 |
| BD3 | Bus6 742, Bus9 748, Bus11 752 | USB3.2 hub hub3 728, Dev6 716, Dev4 712 |
| BD4 | Bus10 750 | Dev5 714 |
| BD5 | Bus8 746, Bus12 754, Bus13 756, Bus14 758 | USB3.2 hub hub4 730, Dev1 706, Dev2 708, Dev3 710 |

Detailed Description—Scheduling Optimization for a USB 3.2 Network Topology—4-Tuple Bandwidth Domains As described above, USB3.2 standard supports four different transmission speeds—GEN2x2, GEN2x1, GEN1x2, and GEN1x1. Accordingly, it may be required to support the following speed translations: from GEN2x2 to GEN2x1 or GEN1x2 or GEN1x1, from GEN2x1 to GEN1x2 or GEN1x1, and from GEN1x2 to GEN1x1. Based on this, there are at most three speed translations along any USB path from a USB host to a USB peripheral device. By way of non-limiting example, there are at most four (4) bandwidth domains across a USB bus path between the USB host and any USB peripheral device. However, the maximum number of speed translations and the maximum number of bandwidth domains across the USB bus path may differ according to the total number of different transmission speeds supported in the system.

In some embodiments, a 4-tuple of bandwidth domains for each USB peripheral device may be defined. The 4-tuple bandwidth domain comprises all bandwidth domains across from the USB host to the USB peripheral device. The 4-tuple bandwidth domain may be described in the following format: [bandwidth domain 1, bandwidth domain 2, bandwidth domain 3, bandwidth domain 4].

In the 4-tuple bandwidth domain, "NA" may be designated if a specific bandwidth domain does not exist. The order of the 4-tuple may start from the bandwidth domain attached to the host root hub port, followed by other bandwidth domains along the USB path from the root hub port to the USB peripheral device. When there are less than four bandwidth domains along the USB path from the USB host to the USB peripheral device, the missing bandwidth domains are filled with "NA".

Table 4 below describes 4-tuple bandwidth domains for each USB peripheral device shown in FIG. 5 and based on Table 1 above.

| USB Peripheral | 4-tuple of Bandwidth Domains |
|---|---|
| USB3.2 hub 504 | [BD1, NA, NA, NA] |
| Dev1 506 | [BD1, BD2, NA, NA] |
| Dev2 508 | [BD1, BD3, NA, NA] |

Table 4

Table 5 below describes 4-tuple bandwidth domains for each USB peripheral device shown in FIG. 6 and based on Table 2 above.

TABLE 5

| USB Peripheral | 4-tuple of Bandwidth Domains |
|---|---|
| USB3.2 hub 604 | [BD1, NA, NA, NA] |
| Dev1 606 | [BD1, NA, NA, NA] |
| Dev2 508 | [BD1, BD2, NA, NA] |

Table 6 below describes 4-tuple bandwidth domains for each USB peripheral device shown in FIG. 7 and based on Table 3 above.

TABLE 6

| USB Peripheral | 4-tuple of Bandwidth Domains |
|---|---|
| USB3.2 hub hub1 704 | [BD1, NA, NA, NA] |
| USB3.2 hub hub2 726 | [BD1, BD2, NA, NA] |
| USB3.2 hub hub3 728 | [BD1, BD2, BD3, NA] |
| USB3.2 hub hub4 730 | [BD1, BD2, BD3, BD5] |
| Dev1 706 | [BD1, BD2, BD3, BD5] |
| Dev2 708 | [BD1, BD2, BD3, BD5] |
| Dev3 710 | [BD1, BD2, BD3, BD5] |
| Dev4 712 | [BD1, BD2, BD3, NA] |
| Dev5 714 | [BD1, BD2, BD3, BD5] |
| Dev6 716 | [BD1, BD2, BD3, NA] |
| Dev7 718 | [BD1, NA, NA, NA] |
| Dev8 720 | [BD1, BD2, NA, NA] |
| Dev9 722 | [BD1, NA, NA, NA] |
| Dev10 724 | [BD1, BD2, NA, NA] |

Detailed Description—Scheduling Optimization for a USB 3.2 Network Topology—Concurrency Score As described above, to improve performance of the USB system and for optimization of scheduling of data transfer, it may be required to identify which endpoints may be scheduled for concurrent data transfer. A concurrency score may determine if the two endpoints may be scheduled for simultaneous data transfer.

In some embodiments, by way of non-limiting example, a concurrency score may be determined as follows.

A concurrency score of value zero (0) may be assigned if the two USB peripheral devices are the same USB peripheral device. As described above, the USB peripheral device may be a USB device or a USB hub.

If the two USB peripheral devices are different, each element of a 4-tuple of bandwidth domains of one USB peripheral device is compared with each element of a 4-tuple of bandwidth domains of another USB peripheral device. A sub concurrency score may be assigned for comparison of the each element. While comparing the each element, a sub concurrency score of value 0 may be assigned if the two elements being compared are same, and a sub concurrency score of value 1 may be assigned if the two elements being compared are different. Accordingly, four sub concurrency scores, for example, sub_score_1, sub_score_2, sub_score_3, and sub_score_4 may be determined. Here, sub_score_1 may correspond with the comparison of the first element, i.e., "bandwidth domain 1" field of the 4-tuple of the bandwidth domains. Similarly sub_score_2, sub_score_3, and sub_score_4 may correspond with the comparison of the second, third, and fourth element, i.e., "bandwidth domain 2," "bandwidth domain 3," and "bandwidth domain 4" fields of the 4-tuple of the bandwidth domains.

By way of non-limiting example, a total concurrency score may be determined as a weighted score of the four sub concurrency scores using the equation below.

$$\text{total concurrency score} = \text{sub\_score\_1} * 2^4 + \text{sub\_score\_2} * 2^3 + \text{sub\_score\_3} * 2^2 + \text{sub\_score\_4} * 2^1 + 1$$

For example, to determine whether the USB device Dev3 710 and USB hub hub1 704 may be scheduled for concurrent data transfer can be determined based on a concurrency score calculated as shown above. A 4-tuple of bandwidth domains for the USB device Dev3 710 is [BD1, BD2, BD3, BD5] according to Table 6 above. Similarly, a 4-tuple of bandwidth domains for the USB hub hub1 704 is [BD1, NA, NA, NA] according to Table 6 above. Except "bandwidth domain 1" all other elements of the 4-tuple of bandwidth domains are different for the USB device Dev3 710 and the USB hub hub1 704. Therefore, sub_score_1 may be assigned a value of zero (0) and sub_score_2, sub_score_3, and sub_score_4 each may be assigned a value of one (1). A total concurrency score may therefore be 15 calculated as $(0*2^4+1*2^3+1*2^2+1*2^1+1)$.

By way of non-limiting example, the total concurrency score may be assigned a value zero (0) if each element of a 4-tuple of bandwidth domains of one USB peripheral device is same as the corresponding element of a 4-tuple of bandwidth domains of another USB peripheral device, otherwise the total concurrency score may be assigned a value of one (1). For example, a concurrency score of Dev2 708 with Dev3 710 would be zero (0) because each element of a 4-tuple of bandwidth domains of Dev2 708 is same as the corresponding element of a 4-tuple of bandwidth domains of Dev3 710. Similarly, a concurrency score of Dev6 716 with Dev8 720 would be one (1) because each element of a 4-tuple of bandwidth domains of Dev6 716 is not same as the corresponding element of a 4-tuple of bandwidth domains of Dev8 720.

Table 7 below lists concurrency score for each USB peripheral device with other USB peripheral device in the USB network of FIG. 7.

TABLE 7

|       | Hub1 | Hub2 | Hub3 | Hub4 | dev1 | Dev2 | Dev3 | Dev4 | Dev5 | Dev6 | Dev7 | Dev8 | Dev9 | dev10 |
|-------|------|------|------|------|------|------|------|------|------|------|------|------|------|-------|
| Hub1  | 0    | 9    | 13   | 15   | 15   | 15   | 15   | 13   | 15   | 13   | 1    | 9    | 1    | 9     |
| Hub2  | 9    | 0    | 5    | 7    | 7    | 7    | 7    | 5    | 7    | 5    | 9    | 1    | 9    | 1     |
| Hub3  | 13   | 5    | 0    | 3    | 3    | 3    | 3    | 1    | 3    | 1    | 13   | 5    | 13   | 5     |
| Hub4  | 15   | 7    | 3    | 0    | 1    | 1    | 1    | 3    | 3    | 3    | 15   | 7    | 15   | 7     |
| Dev1  | 15   | 7    | 3    | 1    | 0    | 1    | 1    | 3    | 3    | 3    | 15   | 7    | 15   | 7     |
| Dev2  | 15   | 7    | 3    | 1    | 1    | 0    | 1    | 3    | 3    | 3    | 15   | 7    | 15   | 7     |
| Dev3  | 15   | 7    | 3    | 1    | 1    | 1    | 0    | 3    | 3    | 3    | 15   | 7    | 15   | 7     |
| Dev4  | 13   | 5    | 1    | 3    | 3    | 3    | 3    | 0    | 3    | 1    | 13   | 5    | 13   | 5     |
| Dev5  | 15   | 7    | 3    | 3    | 3    | 3    | 3    | 3    | 0    | 3    | 15   | 7    | 15   | 7     |
| Dev6  | 13   | 5    | 1    | 3    | 3    | 3    | 3    | 1    | 3    | 0    | 13   | 5    | 13   | 5     |
| Dev7  | 1    | 9    | 13   | 15   | 15   | 15   | 15   | 13   | 15   | 13   | 0    | 9    | 1    | 9     |
| Dev8  | 9    | 1    | 5    | 7    | 7    | 7    | 7    | 5    | 7    | 5    | 9    | 0    | 9    | 1     |
| Dev9  | 1    | 9    | 13   | 15   | 15   | 15   | 15   | 13   | 15   | 13   | 1    | 9    | 0    | 9     |
| Dev10 | 9    | 1    | 5    | 7    | 7    | 7    | 7    | 5    | 7    | 5    | 9    | 1    | 9    | 0     |

As another example, table 8 lists concurrency score for each USB peripheral device with other USB peripheral device in the USB network of FIG. 7 in which the concurrency score is determined as a weighted score of the four sub concurrency scores using the below equation.

$$\text{total concurrency score} = \text{sub\_score\_1}*2^3 + \text{sub\_score\_2}*2^2 + \text{sub\_score\_3}*2^1 + \text{sub\_score\_4}*1$$

TABLE 8

|       | Hub1 | Hub2 | Hub3 | Hub4 | Dev1 | Dev2 | Dev3 | Dev4 | Dev5 | Dev6 | Dev7 | Dev8 | Dev9 | Dev10 |
|-------|------|------|------|------|------|------|------|------|------|------|------|------|------|-------|
| Hub1  | 0    | 4    | 6    | 7    | 7    | 7    | 7    | 6    | 7    | 6    | 0    | 4    | 0    | 4     |
| Hub2  | 4    | 0    | 2    | 3    | 3    | 3    | 3    | 2    | 3    | 2    | 4    | 0    | 4    | 0     |
| Hub3  | 6    | 2    | 0    | 1    | 1    | 1    | 1    | 0    | 1    | 0    | 6    | 2    | 6    | 2     |
| Hub4  | 7    | 3    | 1    | 0    | 0    | 0    | 0    | 1    | 1    | 1    | 7    | 3    | 7    | 3     |
| Dev1  | 7    | 3    | 1    | 0    | 0    | 0    | 0    | 1    | 1    | 1    | 7    | 3    | 7    | 3     |
| Dev2  | 7    | 3    | 1    | 0    | 0    | 0    | 0    | 1    | 1    | 1    | 7    | 3    | 7    | 3     |
| Dev3  | 7    | 3    | 1    | 0    | 0    | 0    | 0    | 1    | 1    | 1    | 7    | 3    | 7    | 3     |
| Dev4  | 6    | 2    | 0    | 1    | 1    | 1    | 1    | 0    | 1    | 0    | 6    | 2    | 6    | 2     |
| Dev5  | 7    | 3    | 1    | 1    | 1    | 1    | 1    | 1    | 0    | 1    | 7    | 3    | 7    | 3     |
| Dev6  | 6    | 2    | 0    | 1    | 1    | 1    | 1    | 0    | 1    | 0    | 6    | 2    | 6    | 2     |
| Dev7  | 0    | 4    | 6    | 7    | 7    | 7    | 7    | 6    | 7    | 6    | 0    | 4    | 0    | 4     |
| Dev8  | 4    | 0    | 2    | 3    | 3    | 3    | 3    | 2    | 3    | 2    | 4    | 0    | 4    | 0     |
| Dev9  | 0    | 4    | 6    | 7    | 7    | 7    | 7    | 6    | 7    | 6    | 0    | 4    | 0    | 4     |
| Dev10 | 4    | 0    | 2    | 3    | 3    | 3    | 3    | 2    | 3    | 2    | 4    | 0    | 4    | 0     |

In some embodiments, one or more concurrency scores for each USB peripheral device with reference to one or more other USB peripheral devices in the USB network may be pre-calculated and stored in a memory of the USB host. The one or more concurrency scores for each USB peripheral device may be updated when a new USB peripheral device joins or an existing USB peripheral device leaves the USB network. In some embodiments, the one or more concurrency scores for each USB peripheral devices may be stored using reduced memory because as can be seen from the Table 7 above, the concurrency score table is symmetric and the entries along the diagonal direction from the top left to bottom right are all zero (0).

In some embodiments, the concurrency score may be determined by the USB host as required during scheduling of the data transfer using any of the above exemplary methods or other methods.

As described above, the basic requirement for periodic scheduling is that all the configured periodic endpoints are served based on their ESIT and maximum ESIT payloads. In some embodiments, this may be achieved by creating a sorted list of all the periodic endpoints based on their service intervals. An endpoint with the smallest service interval may be scheduled first for data transfer, and an endpoint with the largest service interval may be scheduled last for data transfer.

Figure 8:
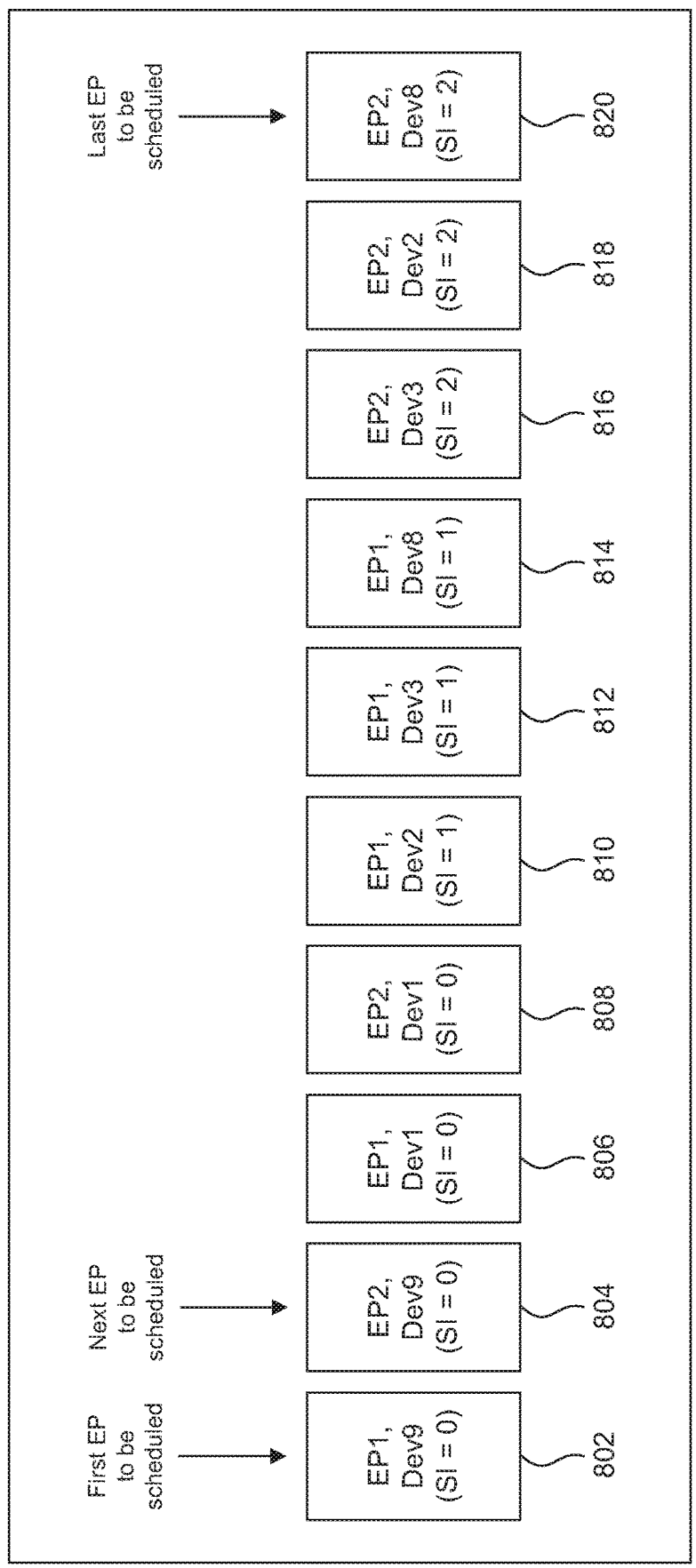
FIG. 8 illustrates periodic endpoint list sorted by service intervals (SIs), according to an exemplary embodiments of the present disclosure.

In accordance with some embodiments, FIG. 8 illustrates an example periodic endpoint list sorted based on ESIT value of a plurality of endpoints of a plurality of USB peripheral devices of FIG. 7. A plurality of endpoints 802, 804, 806, 808, 810, 812, 814, 816, 818 and 820 of the plurality of USB peripheral devices are sorted based on ESIT value. Endpoints with smallest service interval time are scheduled for data transfer ahead of the other endpoints with larger service interval time. For example, endpoints 802, 804, 806, and 808 each with a service interval time of zero (0) are scheduled ahead of endpoints 810, 812, and 814. Similarly, endpoints 816, 818, and 820 with a service interval time of two (2) are scheduled for the transmission last. The endpoints shown in FIG. 8 are from the USB network shown in FIG. 7.

Figure 9:
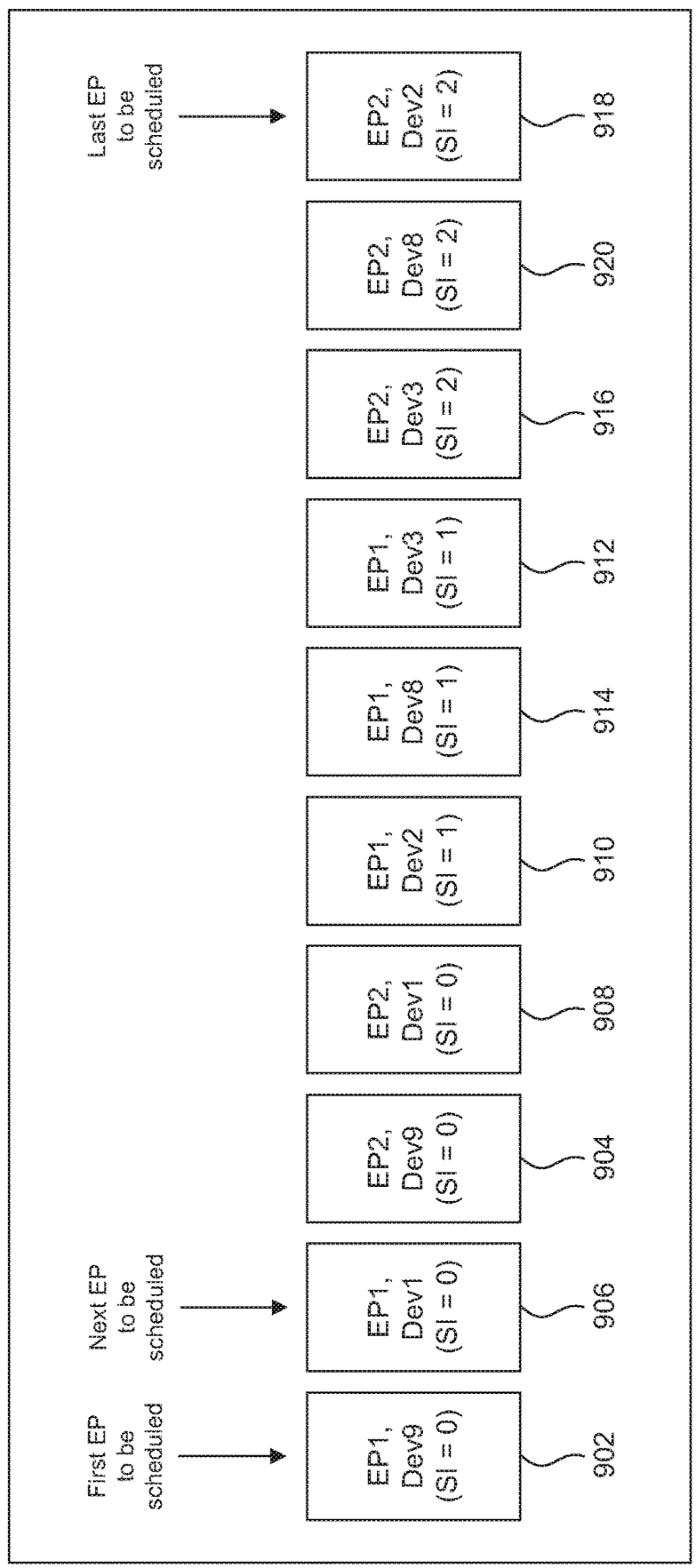
FIG. 9 illustrates periodic endpoint list sorted by Sis and adjusted based on concurrency scores, according to an exemplary embodiments of the present disclosure.

In some embodiments, the periodic endpoint list of FIG. 8 may be optimized using the concurrency score calculated or determined as described above. The periodic endpoint list of FIG. 8 is further adjusted based on the concurrency score of the plurality of the USB peripheral devices as shown in FIG. 9. The endpoints of the same service interval are placed one after another in the list if they are from USB peripherals of the highest concurrency score. For example, in FIG. 8, endpoint EP1 of Dev9 722 is scheduled for data transfer followed by EP2 of Dev9 722 followed by EP1 of Dev1 706 followed by EP2 of Dev1 706. A concurrency score of EP1 of Dev9 722 with reference to EP2 of Dev9 722 is zero based on Table 7 above. However, concurrency score of EP2 of Dev9 722 with reference to EP1 of Dev1 706 is fifteen (15). Therefore, the EP1 of Dev1 706 is scheduled ahead of EP2 of Dev9 722 as shown in FIG. 9. Though, only concurrency score of the first selected endpoint, i.e., EP2 of Dev9 722 is compared with its concurrency score with respect to EP1 of Dev9 722 and EP1 of Dev1 706 for brevity, the concurrency score may be compared against all remaining endpoints having a similar value of ESIT to determine an endpoint for each position. Based on the sorting procedure as described above, EP1 of Dev8 720 is scheduled ahead of EP1 of Dev3 710 as shown in FIG. 9 because a concurrency score of EP1 of Dev2 708 with respect to EP1 of Dev8 720 is 7, which is higher than a concurrency score of EP1 of Dev2 708 with respect to EP1 of Dev3 710 that is 1 according to Table 7. An order of endpoints based on service interval time as shown in FIG. 8 is 802, 804, 806, 808, 810, 812, 814, 816, 818, and 820 when sorted again based on the concurrency score as shown in FIG. 9 is 902, 906, 904, 908, 910, 914, 912, 916, 920 and 918. Where the endpoint 802 corresponds with the endpoint 902, the endpoint 806 corresponds with the endpoint 906, and so on. The endpoints shown in FIG. 9 are from the USB network shown in FIG. 7. Further, the ordering of endpoints in FIG. 8 and FIG. 9 corresponds to scheduling for a micro frame.

Sorting of the endpoints as described above may generate a list of different order of endpoints if a different endpoint is selected to be transmitted first, which may or may not allow concurrent transfer for some of the endpoints. Accordingly, multiple iterations may be executed to determine a sorted list of endpoints based on the ESIT and concurrency score, and the sorted list in which USB bus utilization may be maximized may be selected.

Figure 10:
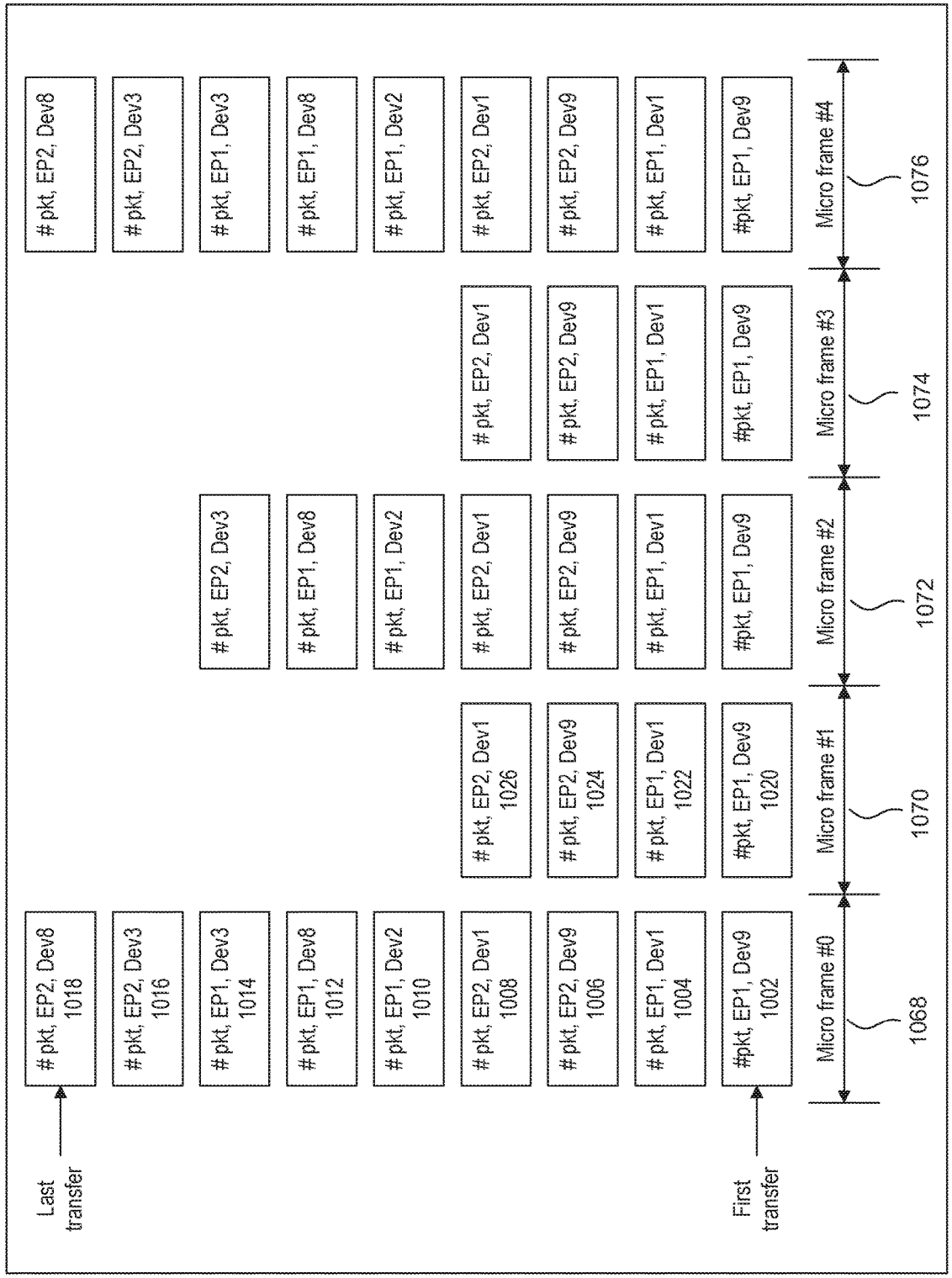
FIG. 10 illustrates an order of scheduling tokens, according to an exemplary embodiment of the present disclosure.

FIG. 10 illustrates an order of scheduling tokens, according to an exemplary embodiment of the present disclosure. As a result of the host periodic scheduling a list of scheduling tokens for each micro frame are generated. In some embodiments, by way of non-limiting example, the scheduling token may specify information including a total number of packets, an endpoint of a USB peripheral device, and an order in which they are to be transferred or communicated. As described above with reference to FIG. 8, once the list of periodic endpoints is created, the periodic scheduling process may invoke a sub-process known as endpoint fitting to generate the scheduling tokens for each micro frame. Accordingly, the endpoint fitting sub-process may generate scheduling tokens according to which for a micro frame #0 1068 scheduling tokens 1002, 1004, 1006, 1008, 1010, 1012, 1014, 1016, and 1018 are to be transmitted in the order specified here. Similarly, for a micro frame #1 1070 scheduling tokens 1020, 1022, 1024, and 1026 are to be transmitted in the order specified here. Similarly, scheduling tokens may be generated for a micro frame #2, a micro frame #3, and a micro frame #4.

Figure 11:
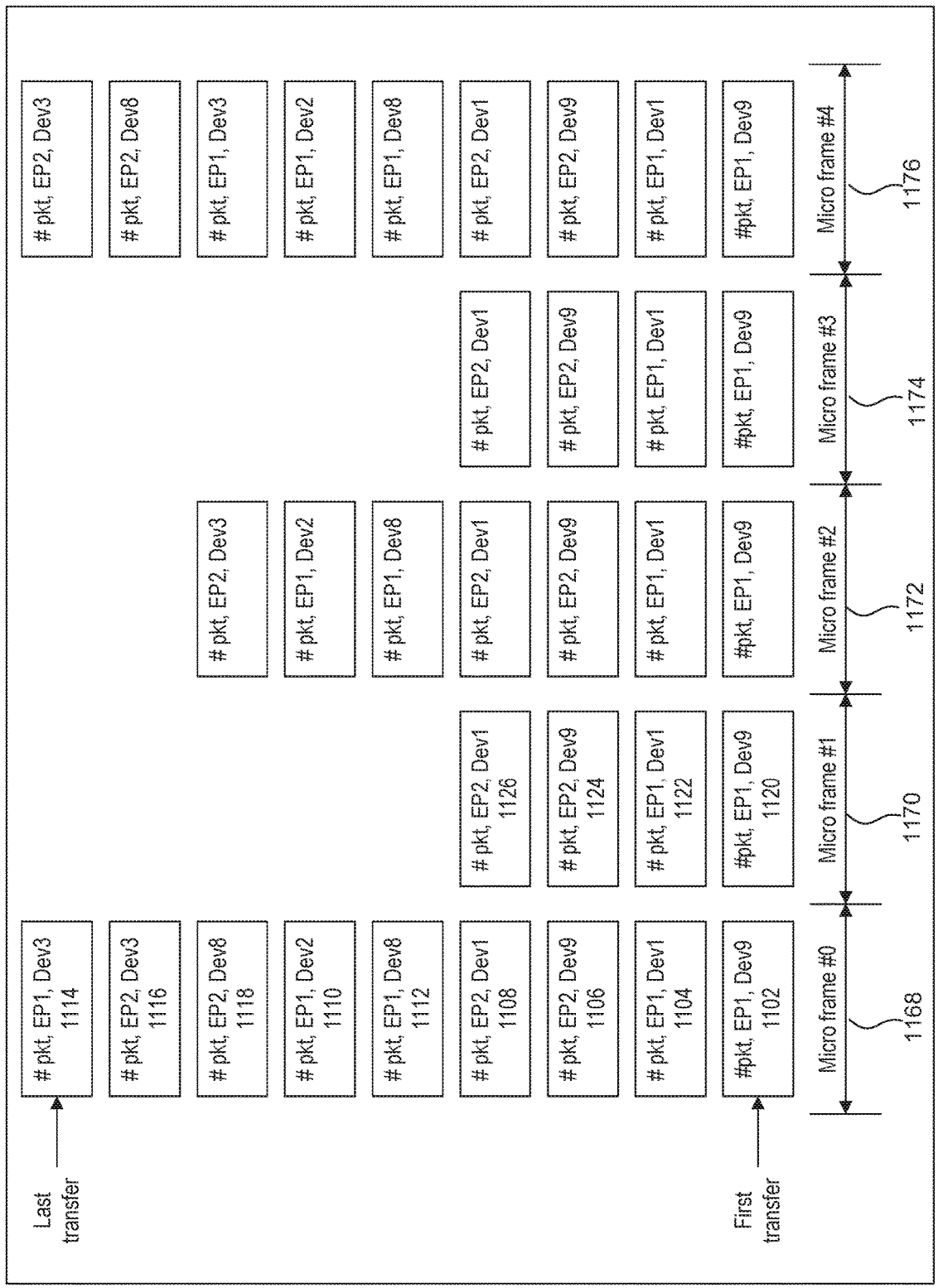
FIG. 11 illustrates an order of scheduling tokens adjusted based on concurrent scores, according to an exemplary embodiments of the present disclosure.

FIG. 11 illustrates an order of scheduling tokens adjusted based on concurrent scores, according to an exemplary embodiments of the present disclosure. As described above with reference to FIG. 9 to sort the endpoints using concurrency score according to Table 7, scheduling tokens are rearranged based on the concurrency scores for each micro frame. As shown in FIG. 11, scheduling tokens for a micro frame #0 1168 are rearranged as 1102, 1104, 1106, 1108, 1112, 1110, 1118, 1116, and 1114. However, for a micro frame #1, rearrangement based on the concurrency score does not change an order of the scheduling tokens.

Detailed Description—Scheduling Optimization for a USB 3.2 Network Topology—Determining Bandwidth As described above, another requirement is the no USB bus bandwidth limit should be exceeded. Accordingly, it is required that the available bandwidth for the USB bus be shared among a number of packets to be communicated with a plurality of USB peripheral devices based on the size of the packets. As described above, USB buses of USB3.2 standard may support four (4) different bandwidths and there may be three (3) different speed translations along a USB path from a USB host to a USB peripheral device. Therefore, bandwidth determination may become challenging. However, the bandwidth for IN transfer and OUT transfer may be determined as described herein.

Following useful terms are defined to help a person skilled in the art to practice the embodiments described herein.

STF: speed translation factor=fast bus speed divided by slow bus speed.

$STF_{12}$, $STF_{BD13}$, $STF_{BD14}$, $STF_{BD23}$, $STF_{BD34}$ are speed translation factors between BD1 and BD2, BD1 and BD3, BD1 and BD4, BD2 and BD3, BD3 and BD4, respectively.

ISTF: inverse speed translation factor=slow bus speed divided by fast bus speed.

$ISTF_{BD12}$, $ISTF_{BD13}$, $ISTF_{BD14}$, $ISTF_{BD23}$, $ISTF_{BD24}$ are inverse speed translation factors between BD 1 and 2, BD 1 and 3, BD 1 and 4, BD 2 and 3, BD 3 and 4, respectively.

$Hub_{delay}$: delay caused by USB hubs.

$total_{numberofhub}$: total number of hubs between the root hub port and the USB peripheral device.

$Number_{ofhubBD234}$ number of hubs between the first speed translation hub and the USB peripheral device.

$Number_{ofhubBD1}$ number of hubs between the first BD and the second BD.

$Speed_{BD1}$, $Speed_{BD2}$, $Speed_{BD3}$, $Speed_{BD4}$: bus speed of the first, second, third and fourth BDs respectively.

Bandwidth is defined as the number of bytes that can be received or sent during a specific period of time.

Used bandwidth is defined as the number of bytes that could have been received or sent from the current micro frame start to present time. $Used_{bandwidthBD1}$, $Used_{bandwidthBD2}$, $Used_{bandwidthBD3}$, $Used_{bandwidthBD4}$ are used bandwidths of BD1, BD2, BD3 and BD4, respectively.

Total bandwidth is defined as the number of bytes that could have been received or sent from the beginning to the end of the micro frame.

$Total_{bandwidthBD1}$, $Total_{bandwidthBD2}$, $Total_{bandwidthBD3}$, $Total_{bandwidthBD4}$ are Total available bandwidths of BD1, BD2, BD3 and BD4, respectively.

To simplify the description, it is being assumed that the path from the root hub port to the USB peripheral devices of the EP always crosses four bandwidth domains.

To apply the formula to the case where the path from the root hub port to the USB peripheral devices of the EP crosses one bandwidth domain, two bandwidth domains, or three bandwidth domains, zero bandwidth may be assigned to the missing bandwidth domains.

Total available bandwidth is defined as the total number of bytes that can be received or sent from present time to the end of the micro frame.

Remaining bandwidth=total available bandwidth−used bandwidth.

For successful scheduling for a micro frame, it may be required that remaining bandwidths of all BDs are greater or equal to zero. For successful scheduling for an EP, it may be required successful scheduling for all micro frames for the EP. For successful periodic scheduling, it may be required successful scheduling for all EPs. Bandwidth calculations for OUT transfer and IN transfer are described below in detail.

Bandwidth calculations for OUT transfers:

The transmit (TX) throughput of the USB network is restricted by the slowest bus. In some embodiments, by way of non-limiting example, a bandwidth required for an OUT endpoint to transmit N bytes may be calculated using following steps.

In step 1, speed of the OUT endpoint may be obtained.

In step 2, speed of a first bus bandwidth domain may be obtained.

In step 3, speed translation factor between the first bus bandwidth domain and the bus bandwidth domain where the OUT endpoint is located may be determined.

In step 4, used bandwidth for the first bus bandwidth domain may be obtained using the following equation.

$$Used\_Bandwidth_{BD1}=Used\_Bandwidth_{BD1}(old)+N*STF+Speed_{BD1}*hub\_delay*total\_number\_of\_hubs$$

When there is no other endpoint being scheduled for concurrent transfer, then used bandwidth for the first bus bandwidth domain may only be considered in the calculations.

In some embodiments, one or more transmit engines may be used to transmit data from OUT endpoints. Status of the one or more transmit (TX) engines may be maintained by periodically checking size of the number of TX engines and/or completion time for packets scheduled to be transmitted by the one or more TX engines. By way of non-limiting examples, the number of bytes that may have been transferred on the first bus bandwidth domain may be determined for a micro frame since the beginning of the micro frame to the completion time. For each micro frame, TX completion list for each TX engine may be initialized with zero (0).

In some embodiments, if there are enough buffers in a USB hub where speed translation may occur, no flow control may be applied on the data transfer at the upstream port of the USB hub.

In some embodiments, when the EP is being concurrently scheduled for data transfer with other endpoint(s), the used bandwidth for transfer of N bytes may be calculated as follows.

In step 1, find all bus bandwidth domains or a 4-tuple of bus bandwidth domains of a USB peripheral device as described above.

In step 2, obtain the used bandwidth for all bus bandwidth domains or for each element of the 4-tuple of bus bandwidth domains of the USB peripheral device.

In step 3, find an entry in the TX completion list that has the earliest completion time $TX_{Ci}$. In other words, a TX engine with less number of bytes pending to transmit may be determined.

In step 4, start time for transmission $TX_{start}$ may be determined according to $TX_{start}$=max ($TX_{Ci}$, Used_Bandwidth_BD1 (old), Used_Bandwidth_BD2 (old)*$STF_{BD12}$, Used_Bandwidth_BD3 (old)*$STF_{BD13}$, Used_Bandwidth_BD4 (old)*$STF_{BD14}$).

In step 5, the used bandwidth for all bus bandwidth domains may be updated according to:

Used_Bandwidth_BD1 (adjust)=$TX_{start}$.
Used_Bandwidth_BD2 (old)=$TX_{start}*ISTF_{BD12}$.
Used_Bandwidth_BD3 (old)=$TX_{start}*ISTF_{BD13}$.
Used_Bandwidth_BD4 (old)=$TX_{start}*ISTF_{BD14}$.

In step 6, the used bandwidth for all bus bandwidth domains may be updated according to:

Used_Bandwidth_BD1=Used_Bandwidth_BD1 (old)+N.
Used_Bandwidth_BD2=Used_Bandwidth_BD2 (old)+N+$Speed_{BD2}*hub\_delay*number\_of\_hubs_{BD12}$
Used_Bandwidth_BD3=Used_Bandwidth_BD3 (old)+N+$Speed_{BD3}*hub\_delay*number\_of\_hubs_{BD13}$
Used_Bandwidth_BD4=Used_Bandwidth_BD4 (old)+N+$Speed_{BD4}*hub\_delay*number\_of\_hubs_{BD14}$ In step 7, an entry of the earliest completion time in the TX completion list may be replaced with Used_Bandwidth_BD1 as calculated above.

In some embodiments, a total number of packets an OUT endpoint may send with the available bandwidth may be determined as follows.

In step 1, find all bus bandwidth domains or a 4-tuple of bus bandwidth domains of a USB peripheral device as described above.

In step 2, obtain the used bandwidth for all bus bandwidth domains or for each element of the 4-tuple of bus bandwidth domains of the USB peripheral device.

In step 3, find an entry in the TX completion list that has the earliest completion time $TX_{Ci}$. In other words, a TX engine with less number of bytes pending to transmit may be determined.

In step 4, start time for transmission $TX_{start}$ may be determined according to $TX_{start}=\max(TX_{Ci}, \text{Used\_Bandwidth\_BD1 (old)}, \text{Used\_Bandwidth\_BD2 (old)}*STF_{BD12}, \text{Used\_Bandwidth\_BD3 (old)}*STF_{BD13}, \text{Used\_Bandwidth\_BD4 (old)}*STF_{BD14})$.

In step 5, used bandwidths for a primary bus, a first secondary, a second secondary bus, and a third secondary bus may be determined as follows:

Used_Bandwidth_BD1=$TX_{start}$.
Used_Bandwidth_BD2=$TX_{start}*ISTF_{BD12}$.
Used_Bandwidth_BD3=$TX_{start}*ISTF_{BD13}$.
Used_Bandwidth_BD4=$TX_{start}*ISTF_{BD14}$.

In step 6, total number of packets that can be sent out may be determined as total_number_of_packets=(Total_Bandwidth_BD1−Used_Bandwidth_BD1)/Maximum_Packet_Size.

In some embodiments, similar to the TX completion list, a RX completion list may be maintained, and a total number of packets that may be received may be determined as described above.

Figure 12:
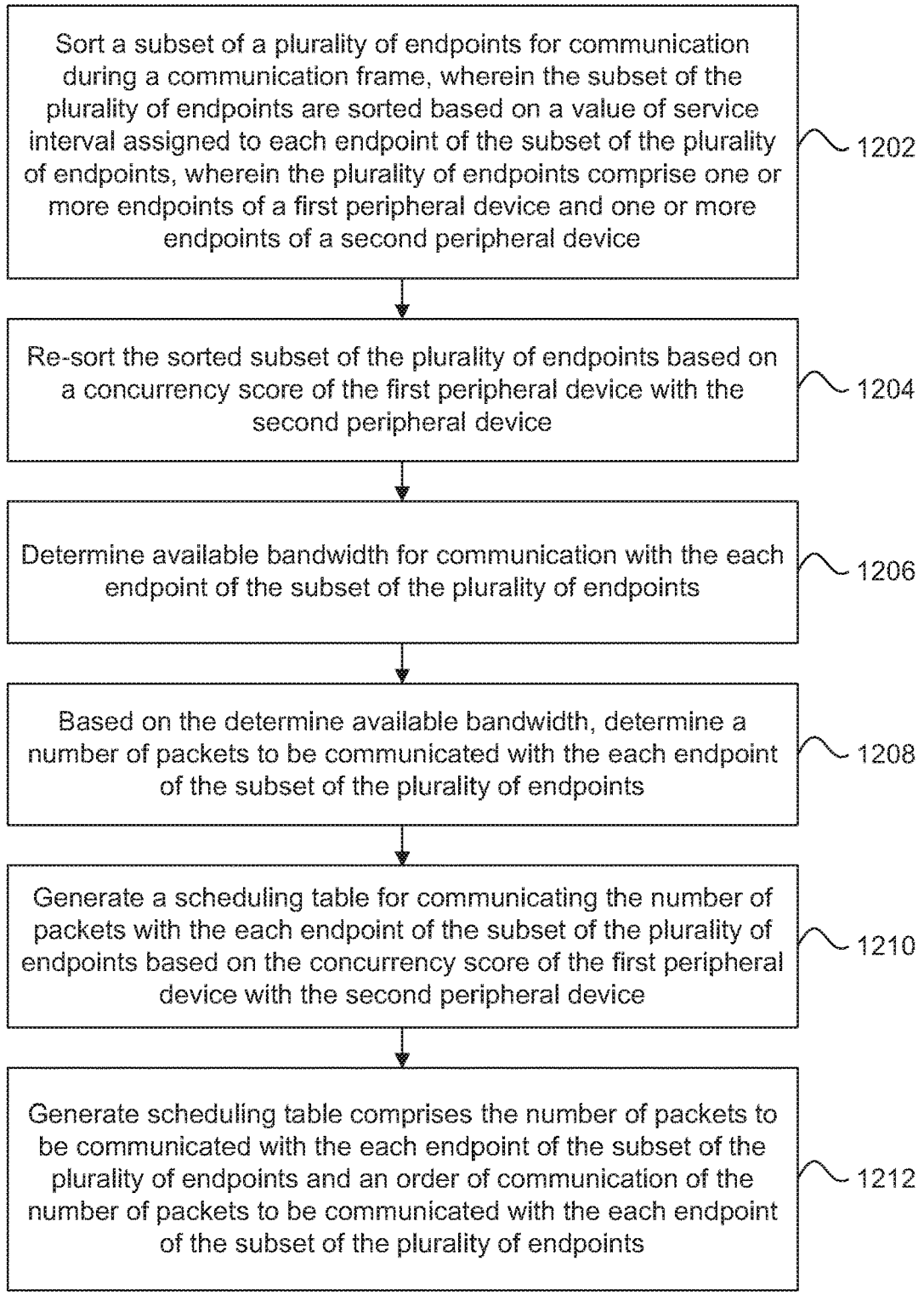
FIG. 12 illustrates a flow diagram of USB host periodic scheduling, according to an exemplary embodiment of the present disclosure.

Detailed Description—Scheduling Optimization for a USB 3.2 Network Topology—an Example Method FIG. 12 illustrates a flow diagram of USB host periodic scheduling, according to an exemplary embodiment of the present disclosure. The method steps described here may be performed by one or more processors of a USB host. At step 1202, a subset of a plurality of endpoints for communication during a communication frame may be sorted based on a value of service interval assigned to each endpoint of the subset of the plurality of endpoints. The communication frame as described above may be a micro frame. The plurality of endpoints may include one or more endpoints of a first peripheral device and one or more endpoints of a second peripheral device.

At step 1204, the sorted subset of the plurality of endpoints may be sorted again based on a concurrency score of the first peripheral device with the second peripheral device. The sorting based on concurrency score may optimize scheduling as described above. To determine concurrency score, one or more bus bandwidth domains and one or more buses between a host device and the first peripheral device and the host device and the second peripheral device may be identified. The one or more bus bandwidth domains between the host device and the first peripheral device and the host device and the second peripheral device may be ordered based on proximity of the one or more bus bandwidth domains from the host device. Subsequently, the ordered one or more bus bandwidth domains between the host device and the first peripheral device may be compared with the ordered one or more bus bandwidth domains between the host device and the second peripheral device to determine the concurrency score of the first peripheral device with the second peripheral device. In other words, the ordered one or more bus bandwidth domains form n-tuple of bandwidth domains, where n represents a total number of unique data speeds supported by the USB system.

In some embodiments, for the comparing the ordered one or more bus bandwidth domains, each element of a first n-tuple of bandwidth domains between the host device and the first peripheral device may be compared with an similarly indexed element of a second n-tuple of bandwidth domains between the host device and the second peripheral device. In response to the comparison showing the compared at least one element of the first n-tuple of bandwidth domains with the similarly indexed element of the second n-tuple of bandwidth domains being different, the concurrency score of the first peripheral device with the second peripheral device be assigned a value of one (1) indicating the first peripheral device and the second peripheral device can be concurrently served.

In some embodiments, for the comparing the ordered one or more bus bandwidth domains, each element of a first n-tuple of bandwidth domains between the host device and the first peripheral device may be compared with an similarly indexed element of a second n-tuple of bandwidth domains between the host device and the second peripheral device. In response to the comparison showing the compared element of the first n-tuple of bandwidth domains with the similarly indexed element of the second n-tuple of bandwidth domains being different, a weighted sub-score may be generated for the compared element of the first n-tuple of bandwidth domains. The concurrency score of the first peripheral device with the second peripheral device may be generated based on the weighted sub-score for the compared element of the first n-tuple of bandwidth domains with the similarly indexed element of the second n-tuple of bandwidth domains being different.

In some embodiments, the generated concurrency score may be a first preconfigured value, a second preconfigured value, or a value in between the first preconfigured value and the second preconfigured value. The first preconfigured value may be smaller than the second preconfigured value.

In some embodiments, the generated concurrency score above a preconfigured threshold value may indicate the first peripheral device and the second peripheral device can be concurrently served.

At step 1206, available bandwidth for communication with the each endpoint of the subset of the plurality of endpoints may be determined. For determining the available bandwidth, required bandwidth for communicating a plurality of packets based on a transmission speed translation factor between a bandwidth domain of a host device and bandwidth domain of the first peripheral device may be determined. The transmission speed translation factor may be determined by dividing a larger speed of the bandwidth domain of the host device or the peripheral device by a smaller speed of the bandwidth domain of the host device or the first peripheral device. Available bandwidth may be determined as a difference of the required bandwidth and the used bandwidth, which may be determined based on transmission speed translation factors of one or more bandwidth domains between a host device and the first peripheral device.

At step 1208, based on the determined available bandwidth, a number of packets to be communicated with the each endpoint of the subset of the plurality of endpoints may be determined. As described above, a total number of packets that can be transferred may be determined based on the available bandwidth and maximum packet size.

At step 1210, a scheduling table for communicating the number of packets with the each endpoint of the subset of the plurality of endpoints based on the concurrency score of the first peripheral device with the second peripheral device may be generated. The generated scheduling table may include the number of packets to be communicated with the each endpoint of the subset of the plurality of endpoints and an order of communication of the number of packets to be communicated with the each endpoint of the subset of the plurality of endpoints.

As described above, various embodiments as described herein may be used to optimize host periodic scheduling in any network including a USB network to improve USB bandwidth utilization. Various embodiments described herein are not limited to USB3.2 standard but can be easily extended for future USB standards and other similar areas of applications.

Detailed Description—Technology Support from Data/Instructions to Processors/Programs Data and Information. While 'data' and 'information' often are used interchangeably (e.g., 'data processing' and 'information processing'), the term 'datum' (plural 'data') typically signifies a representation of the value of a measurement of a physical quantity (e.g., the current in a wire), or the answer to a question (e.g., "yes" or "no"), while the term 'information' typically signifies a structured set of data (often times signified by 'data structure'). A specified data structure is used to structure an electronic device to be used as a specific machine as an article of manufacture (see In re Lowry, 32 F.3d 1579 [CAFC, 1994]). Data and information are physical, for example binary data (a 'bit', usually signified with '0' and '1') enabled with two different levels of voltage in a circuit. For example, data can be enabled as an electrical, magnetic, optical or acoustical signal; a quantum state such as spin that enables a 'qubit'; or a physical state of an atom or molecule. All such data and information, when enabled, are stored, accessed, transferred, combined, compared, or otherwise acted upon, actions that require energy.

As used herein, the term 'process' signifies an unnatural sequence of physical actions and/or transformations (both also referred to as 'operations' or 'steps') to produce at least one result. The actions and transformations are technical applications of one or more natural laws of science or unnatural laws of technology. The actions and transformations often change the physical state of a machine, of structures of data and information, or of a composition of matter. Two or more actions can occur at about the same time, or one action can occur before or after another action, if they produce the same result. A description of the physical actions and/or transformations that comprise a process are often signified with a set of gerund phrases (or their semantic equivalents) that are typically preceded with the signifier 'the steps of' (e.g., "a process comprising the steps of measuring, transforming, partitioning and then distributing . . . "). The signifiers 'algorithm', 'method', 'procedure', '(sub)routine', 'protocol', 'recipe', and 'technique' often are used interchangeably with 'process', and 35 U.S.C. 100 defines a "method" as one type of process that is, by statutory law, always patentable under 35 U.S.C. 101. Many forms of knowledge, learning, skills and styles are authored, structured, and enabled—objectively—as processes—e.g., knowledge and learning as functions in knowledge programming languages. As used herein, the term 'rule' signifies a process with at least one conditional test (signified, e.g., by 'IF test THEN process'). As used herein, the term 'thread' signifies a sequence of operations or instructions that comprise a subset of an entire process. A process can be partitioned into multiple threads that can be used at or about at the same time.

As used herein, the term 'component' (also signified by 'part', and typically signified by 'element' when described in a patent text or diagram) signifies a physical object that is used to enable a process in combination with other components. For example, electronic components are used in processes that affect the physical state of one or more electromagnetic or quantum particles/waves (e.g., electrons, photons) or quasiparticles (e.g., electron holes, phonons, magnetic domains) and their associated fields or signals. Electronic components have at least two connection points to which are attached 'leads', typically a conductive wire or an optical fiber, with one end attached to the component and the other end attached to another component, typically as part of a circuit with current flows. There are at least three types of electrical components: passive, active and electromechanical. Passive electronic components typically do not introduce energy into a circuit—such components include resistors, memristors, capacitors, magnetic inductors, crystals, Josephson junctions, transducers, sensors, antennas, waveguides, etc. Active electronic components require a source of energy and can inject energy into a circuit—such components include semiconductors (e.g., diodes, transistors, optoelectronic devices), vacuum tubes, batteries, power supplies, displays (e.g., LEDs, LCDs, lamps, CRTs, plasma displays). Electromechanical components affect current flow using mechanical forces and structures—such components include switches, relays, protection devices (e.g., fuses, circuit breakers), heat sinks, fans, cables, wires, terminals, connectors and printed circuit boards. As used herein, the term 'netlist' is a specification of the components comprising an electric circuit, and electrical connections between the components. The programming language for the SPICE circuit simulation program is often used to specify a netlist. In the context of circuit design, the term 'instance' signifies each time a component is specified in a netlist.

One of the most important components as goods in commerce is the integrated circuit, and its res of abstractions. As used herein, the term 'integrated circuit' signifies a set of connected electronic components on a small substrate (thus the use of the signifier 'chip') of semiconductor material, such as silicon or gallium arsenide, with components fabricated on one or more layers. Other signifiers for 'integrated circuit' include 'monolithic integrated circuit', 'IC', 'chip', 'microchip' and 'System on Chip' ('SoC'). Examples of types of integrated circuits include gate/logic arrays, processors, memories, interface chips, power controllers, and operational amplifiers. The term 'cell' as used in electronic circuit design signifies a specification of one or more components, for example, a set of transistors that are connected to function as a logic gate. Cells are usually stored in a database, to be accessed by circuit designers and design processes.

As used herein, the term 'module' signifies a tangible structure for acting on data and information. For example, the term 'module' can signify a process that transforms data and information, for example, a process comprising a computer program. The term 'module' also can signify one or more interconnected electronic components, such as digital logic devices. A process comprising a module, if specified in a programming language, such as System C or Verilog, also can be transformed into a specification for a structure of electronic components that transform data and information that produce the same result as the process. This last sentence follows from a modified Church-Turing thesis, which is simply expressed as "Whatever can be transformed by a (patentable) process and a processor, can be transformed by a (patentable) equivalent set of modules," as opposed to the doublethink of deleting only one of the "(patentable)".

A module is permanently structured (e.g., circuits with unalterable connections), temporarily structured (e.g., circuits or processes that are alterable with sets of data), or a combination of the two forms of structuring. Permanently structured modules can be manufactured, for example, using Application Specific Integrated Circuits ('ASICs') such as Arithmetic Logic Units ('ALUs'), Programmable Logic Arrays ('PLAs'), or Read Only Memories ('ROMs'), all of which are typically structured during manufacturing. For example, a permanently structured module can comprise an integrated circuit. Temporarily structured modules can be manufactured, for example, using Field Programmable Gate Arrays (FPGAs—for example, sold by Xilink or Intel's Altera), Random Access Memories (RAMs) or microprocessors. For example, data and information is transformed using data as an address in RAM or ROM memory that stores output data and information. One can embed temporarily structured modules in permanently structured modules (for example, a FPGA embedded into an ASIC).

Modules that are temporarily structured can be structured during multiple time periods. For example, a processor comprising one or more modules has its modules first structured by a manufacturer at a factory and then further structured by a user when used in commerce. The processor can comprise a set of one or more modules during a first time period, and then be restructured to comprise a different set of one or modules during a second time period. The decision to manufacture or implement a module in a permanently structured form, in a temporarily structured form, or in a combination of the two forms, depends on issues of commerce such as cost, time considerations, resource constraints, tariffs, maintenance needs, national intellectual property laws, and/or specific design goals. How a module is used is mostly independent of the physical form in which it is manufactured or enabled. This last sentence also follows from the modified Church-Turing thesis.

As used herein, the term 'processor' signifies a tangible data and information processing machine for use in commerce that physically transforms, transfers, and/or transmits data and information, using at least one process. A processor consists of one or more modules (e.g., a central processing unit, 'CPU'; an input/output ('I/O') controller, a memory controller, a network controller, and other modules). The term 'processor' can signify one or more processors, or one or more processors with multiple computational cores/CPUs, specialized processors (for example, graphics processors or signal processors), and their combinations. Where two or more processors interact, one or more of the processors can be remotely located. Where the term 'processor' is used in another context, such as a 'chemical processor', it will be signified and defined in that context.

The processor can comprise, for example, digital logic circuitry (for example, a binary logic gate), and/or analog circuitry (for example, an operational amplifier). The processor also can use optical signal processing, DNA transformations or quantum operations, microfluidic logic processing, or a combination of technologies, such as an optoelectronic processor. For data and information structured with binary data, any processor that can transform data and information using the AND, OR and NOT logical operations (and their derivatives, such as the NAND, NOR, and XOR operations) also can transform data and information using any function of Boolean logic. A processor such as an analog processor, such as an artificial neural network, also can transform data and information. No scientific evidence exists that any of these technological processors are processing, storing and retrieving data and information, using any process or structure equivalent to the bioelectric structures and processes of the human brain.

The one or more processors also can use a process in a 'cloud computing' environment, where time and resources of multiple remote computers are shared by multiple users or processors communicating with the computers. For example, a group of processors can use at least one process available at a distributed or remote system, these processors using a communications network (e.g., the Internet, or an Ethernet) and using one or more specified interfaces (e.g., an application program interface ('API') that signifies functions and data structures to communicate with the remote process).

As used herein, the term 'computer' and 'computer system' (further defined below) includes at least one processor that, for example, performs operations on data and information such as (but not limited to) the AND, OR and NOT logical operations using electronic gates that can comprise transistors, with the addition of memory (for example, memory structured with flip-flops using the NOT-AND or NOT-OR operation). Such a processor is Turing-complete and computationally universal. A computer can comprise a simple structure, for example, comprising an I/O module, a CPU, and a memory that performs, for example, the process of inputting a signal, transforming the signal, and outputting the signal with no human intervention.

As used herein, the term 'programming language' signifies a structured grammar for specifying sets of operations and data for use by modules, processors and computers. Programming languages include assembler instructions, instruction-set-architecture instructions, machine instructions, machine dependent instructions, microcode, firmware instructions, state-setting data, or either source code or object code written in any combination of one or more higher level languages, for example, the C programming language and similar general programming languages (such as Fortran, Basic, Javascript, PHP, Python, C++), knowledge programming languages (such as Lisp, Smalltalk, Prolog, or CycL), electronic structure programming languages (such as VHDL, Verilog, SPICE or SystemC), text programming languages (such as SGML, HTML, or XML), or audiovisual programming languages (such as SVG, MathML, X3D/VRML, or MIDI), and any future equivalent programming languages. As used herein, the term 'source code' signifies a set of instructions and data specified in text form using a programming language. A large amount of source code for use in enabling any of the claimed inventions is available on the Internet, such as from a source code library such as Github.

As used herein, the term 'program' (also referred to as an 'application program') signifies one or more processes and data structures that structure a module, processor or computer to be used as a "specific machine" (see In re Alappat, 33 F3d 1526 [CAFC, 1991]). One use of a program is to structure one or more computers, for example, standalone, client or server computers, or one or more modules, or systems of one or more such computers or modules. As used herein, the term 'computer application' signifies a program that enables a specific use, for example, to enable text processing operations, or to encrypt a set of data. As used herein, the term 'firmware' signifies a type of program that typically structures a processor or a computer, where the firmware is smaller in size than a typical application program, and is typically not very accessible to or modifiable by the user of a computer. Computer programs and firmware are often specified using source code written in a programming language, such as C. Modules, circuits, processors, programs, and computers can be specified at multiple levels of abstraction, for example, using the SystemC programming language, and have value as products in commerce as taxable goods under the Uniform Commercial Code (see U.C.C. Article 2, Part 1).

A program is transferred into one or more memories of the computer or computer system from a data and information device or storage system. A computer system typically has a device for reading storage media that is used to transfer the program, and/or has an interface device that receives the program over a network. This process is discussed in the General Computer Explanation section.

Detailed Description—Technology Support General Computer Explanation

Figure 14A:
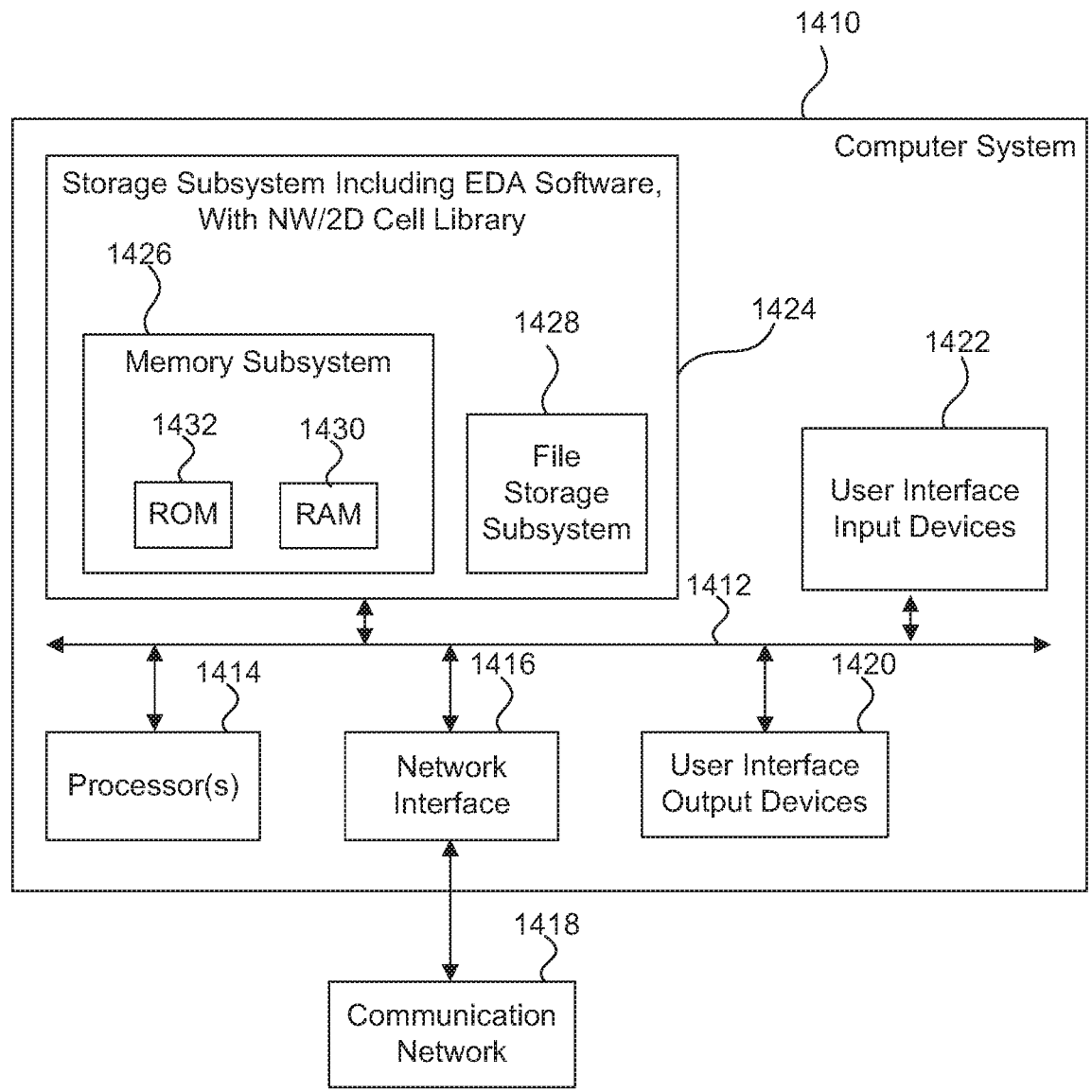
FIGS. 14A and 14B illustrate abstract diagrams of a computer system for use in commerce, if needed, by embodiments of the claimed inventions, as well as an embodiment of a circuit design and an embodiment of a manufactured circuit used in these claimed inventions.
Figure 14B:
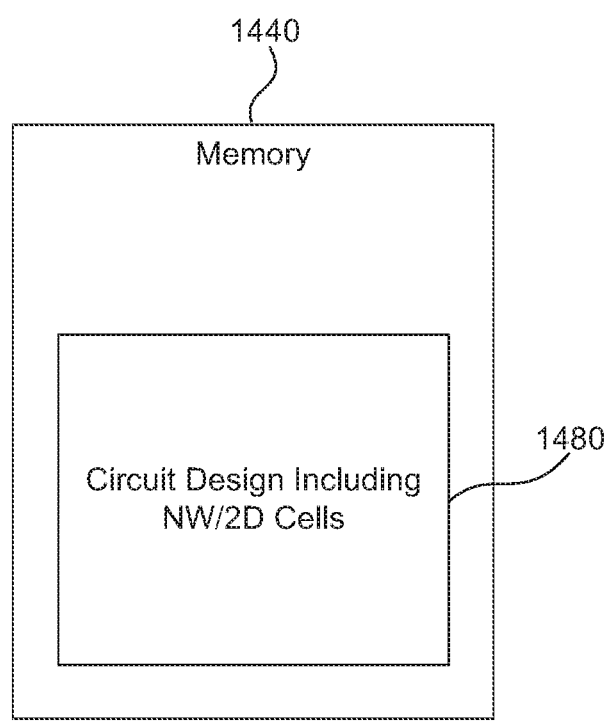

FIGS. 14A and 14B are abstract diagrams of a computer system suitable for enabling embodiments of the claimed inventions.

In FIG. 14A, the structure of computer system 1410 typically includes at least one computer 1414 which communicates with peripheral devices via bus subsystem 1412. Typically, the computer includes a processor (e.g., a microprocessor, graphics processing unit, or digital signal processor), or its electronic processing equivalents, such as an Application Specific Integrated Circuit ('ASIC') or Field Programmable Gate Array ('FPGA'). Typically, peripheral devices include a storage subsystem 1424, comprising a memory subsystem 1426 and a file storage subsystem 1428, user interface input devices 1422, user interface output devices 1420, and/or a network interface subsystem 1416. The input and output devices enable direct and remote user interaction with computer system 1410. The computer system enables significant post-process activity using at least one output device and/or the network interface subsystem.

The computer system can be structured as a server, a client, a workstation, a mainframe, a personal computer (PC), a tablet PC, a set-top box (STB), a personal digital assistant (PDA), a cellular telephone, a smartphone, a web appliance, a rack-mounted 'blade', a kiosk, a television, a game station, a network router, switch or bridge, or any data processing machine with instructions that specify actions to be taken by that machine. The term 'server', as used herein, refers to a computer or processor that typically performs processes for, and sends data and information to, another computer or processor.

A computer system typically is structured, in part, with at least one operating system program, such as Microsoft's Windows, Sun Microsystems's Solaris, Apple Computer's MacOs and iOS, Google's Android, Linux and/or Unix. The computer system typically includes a Basic Input/Output System (BIOS) and processor firmware. The operating system, BIOS and firmware are used by the processor to structure and control any subsystems and interfaces connected to the processor. Typical processors that enable these operating systems include: the Pentium, Itanium and Xeon processors from Intel; the Opteron and Athlon processors from Advanced Micro Devices; the Graviton processor from Amazon; the POWER processor from IBM; the SPARC processor from Oracle; and the ARM processor from ARM Holdings.

The claimed inventions and their embodiments are limited neither to an electronic digital logic computer structured with programs nor to an electronically programmable device. For example, the claimed inventions can use an optical computer, a quantum computer, an analog computer, or the like. Further, where only a single computer system or a single machine is signified, the use of a singular form of such terms also can signify any structure of computer systems or machines that individually or jointly use processes. Due to the ever-changing nature of computers and networks, the description of computer system 1410 depicted in FIG. 14A is intended only as an example. Many other structures of computer system 1410 have more or less components than the computer system depicted in FIG. 14A.

Network interface subsystem 1416 provides an interface to outside networks, including an interface to communication network 1418, and is coupled via communication network 1418 to corresponding interface devices in other computer systems or machines. Communication network 1418 can comprise many interconnected computer systems, machines and physical communication connections (signified by 'links'). These communication links can be wireline links, optical links, wireless links (e.g., using the WiFi or Bluetooth protocols), or any other physical devices for communication of information. Communication network 1418 can be any suitable computer network, for example a wide area network such as the Internet, and/or a local-to-wide area network such as Ethernet. The communication network is wired and/or wireless, and many communication networks use encryption and decryption processes, such as is available with a virtual private network. The communication network uses one or more communications interfaces, which receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. Communication algorithms ('protocols') can be specified using one or communication languages, such as HTTP, TCP/IP, RTP/RTSP, IPX and/or UDP.

User interface input devices 1422 can include an alphanumeric keyboard, a keypad, pointing devices such as a mouse, trackball, toggle switch, touchpad, stylus, a graphics tablet, an optical scanner such as a bar code reader, touchscreen electronics for a display device, audio input devices such as voice recognition systems or microphones, eye-gaze recognition, brainwave pattern recognition, optical character recognition systems, and other types of input devices. Such devices are connected by wire or wirelessly to a computer system. Typically, the term 'input device' signifies all possible types of devices and processes to transfer data and information into computer system 1410 or onto communication network 1418. User interface input devices typically enable a user to select objects, icons, text and the like that appear on some types of user interface output devices, for example, a display subsystem.

User interface output devices 1420 can include a display subsystem, a printer, a fax machine, or a non-visual communication device such as audio and haptic devices. The display subsystem can include a cathode ray tube (CRT), a flat-panel device such as a liquid crystal display (LCD), an image projection device, or some other device for creating visible stimuli such as a virtual reality system. The display subsystem also can provide non-visual stimuli such as via audio output, aroma generation, or tactile/haptic output (e.g., vibrations and forces) devices. Typically, the term 'output device' signifies all possible types of devices and processes to transfer data and information out of computer system 1410 to the user or to another machine or computer system. Such devices are connected by wire or wirelessly to a computer system. Note: some devices transfer data and information both into and out of the computer, for example, haptic devices that generate vibrations and forces on the hand of a user while also incorporating sensors to measure the location and movement of the hand. Technical applications of the sciences of ergonomics and semiotics are used to improve the efficiency of user interactions with any processes and computers disclosed herein, such as any interactions with regards to the design and manufacture of circuits that use any of the above input or output devices.

Memory subsystem 1426 typically includes a number of memories including a main random-access memory ('RAM') 1430 (or other volatile storage device) for storage of instructions and data during program execution and a read only memory ('ROM') 1432 in which fixed instructions are stored. File storage subsystem 1428 provides persistent storage for program and data files, and can include a hard disk drive, a floppy disk drive along with associated removable media, a CD-ROM drive, an optical drive, a flash memory such as a USB drive, or removable media cartridges. If computer system 1410 includes an input device that performs optical character recognition, then text and symbols printed on paper can be used as a device for storage of program and data files. The databases and modules used by some embodiments can be stored by file storage subsystem 1428.

Bus subsystem 1412 provides a device for transmitting data and information between the various components and subsystems of computer system 1410. Although bus subsystem 1412 is depicted as a single bus, alternative embodiments of the bus subsystem can use multiple busses. For example, a main memory using RAM can communicate directly with file storage systems using Direct Memory Access ('DMA') systems.

FIG. 14B depicts a memory 1440 such as a non-transitory, processor readable data and information storage medium associated with file storage subsystem 1428, and/or with network interface subsystem 1416, and can include a data structure specifying a circuit design. The memory 1440 can be a hard disk, a floppy disk, a CD-ROM, an optical medium, removable media cartridge, or any other medium that stores computer readable data in a volatile or non-volatile form, such as text and symbols on paper that can be processed by an optical character recognition system. A program transferred in to and out of a processor from such a memory can be transformed into a physical signal that is propagated through a medium (such as a network, connector, wire, or circuit trace as an electrical pulse); or through a medium such as space or an atmosphere as an acoustic signal, or as electromagnetic radiation with wavelengths in the electromagnetic spectrum longer than infrared light).

Detailed Description—Technology Support EDA System/Workflow Explanation

Figure 13:
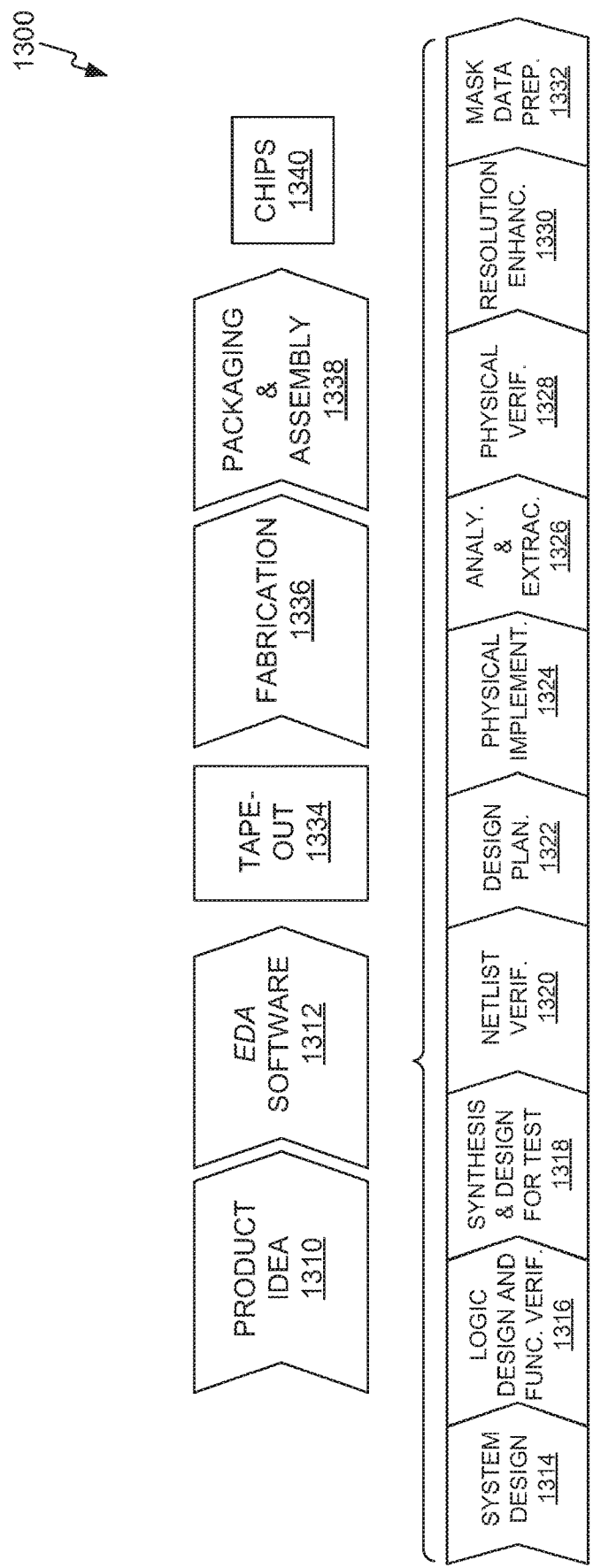
FIG. 13 illustrates a flow-chart of various processes used during the design and fabrication of an integrated circuit, according to an exemplary embodiments of the present disclosure.

FIG. 13 depicts a set of processes 1300 used during the design, verification and fabrication of an article of manufacture such as an integrated circuit to transform and verify design data and instructions that represent the integrated circuit. Each of these processes can be structured and enabled as multiple modules. The term 'EDA' signifies the term 'Electronic Design Automation'. These processes start with the creation of a product idea 1310 with information supplied by a designer, information which is transformed to create an article of manufacture that uses a set of EDA processes 1312. When the design is finalized, it is taped-out 1334, which typically is when artwork (e.g., geometric patterns) for the integrated circuit is sent to a fabrication facility to manufacture the mask set, which is then used to manufacture the integrated circuit. After tape-out, a semiconductor die is manufactured 1336 and packaging and assembly processes 1338 are performed to produce the finished integrated circuit 740.

Specifications for a circuit or electronic structure are as used in commerce at multiple levels of useful abstraction ranging from low-level transistor material layouts to high-level description languages. Most designers start with a description using one or more modules with less detail at a high-level of abstraction to design their circuits and systems, using a hardware description language ('HDL') such as VHDL, Verilog, System Verilog, SystemC, MyHDL or OpenVera. The high-level description is easier for designers to understand, especially for a vast system, and can describe very complex systems that are difficult to understand using a lower level of abstraction that is a more detailed description. The HDL description can be transformed into other levels of abstraction that are used by the developers. For example, a high-level description can be transformed to a logic-level register transfer level ('RTL') description, a gate-level description, a layout-level description, or a mask-level description. Each lower abstraction level that is a less abstract description adds more useful detail into the design description, for example, more details for the modules that comprise the description. The lower-levels of abstraction that are less abstract descriptions can be generated by a computer, derived from a design library, or created by another design automation process. An example of a specification language at a lower level of abstraction language for specifying more detailed descriptions is SPICE, which is much used for detailed descriptions of circuits with many analog components. A circuit specification for a circuit also has value as an article of manufacture in commerce as a good under the Uniform Commercial Code (see U.C.C. Article 2, Part 1). Descriptions at each level of abstraction are enabled for use by the corresponding tools of that layer (for example, a formal verification tool), and some of the modules of the abstractions need not be novel or unobvious.

A design process that uses EDA processes 1312 includes processes 1314 to 1332, which are described below. This design flow description is used only to illustrate, not to limit. For example, a designer of an integrated circuit design can use the design processes in a different sequence than the sequence depicted in FIG. 13. For the embodiments disclosed herein, products from Synopsys, Inc. of Mountain View, Calif. (hereinafter signified by 'Synopsys'), are used to enable these processes, and/or similar products from other companies.

During system design 1314, a designer specifies the functionality to be manufactured. The designer also can optimize the power, performance and area (physical and/or lines of code) and minimize costs, etc. Partitioning of the design into different types of modules can occur at this stage. Exemplary EDA products from Synopsys that enable system design 1314 include: the Model Architect, Saber, System Studio, and Designware products.

During logic design and functional verification 1316, modules in the circuit are specified in one or more description languages, and the specification is checked for functional accuracy, that is, that the modules produce outputs that match the requirements of the specification of the circuit or system being designed. Exemplary HDL languages are Verilog, VHDL and SystemC. Functional verification typically uses simulators and other programs such as test bench generators, static HDL checkers and formal verifiers. In some situations, special systems of modules referred to as 'emulators' or 'prototyping systems' are used to speed up the functional verification. Exemplary EDA products from Synopsys that can be used at this stage include: VCS, Vera, Designware, Magellan, Formality, ESP and Leda products. Exemplary emulator and prototyping products available from Synopsys that enable logic design and functional verification 1316 include: Zebu® and Protolink® (® signifies 'Registered Trademark').

During synthesis and design for test 1318, HDL code is transformed to a netlist (which typically is a graph structure where the edges represent components of a circuit and where the nodes represent how the components are interconnected). Both the HDL code and the netlist are hierarchical articles of manufacture that can be used by an EDA product to verify that the integrated circuit, when manufactured, performs according to its design. This netlist can be optimized for a target semiconductor manufacturing technology. Additionally, the finished integrated circuit is tested to verify that it satisfies the requirements of the specification. Exemplary EDA products from Synopsys that enable synthesis and design for test 718 include: the Design Compiler, Physical Compiler, Test Compiler, Power Compiler, FPGA Compiler, Tetramax, and Designware products.

During netlist verification 1320, the netlist is checked for compliance with timing constraints and for correspondence with the HDL code. Exemplary EDA products from Synopsys that enable netlist verification 1320 include: the Formality, Primetime, and VCS products.

During design planning 1322, an overall floor plan for the integrated circuit is constructed and analyzed for timing and top-level routing. Exemplary EDA products from Synopsys that enable design planning 1322 include: the Astro and IC Compiler products.

During layout implementation 1324, physical placement (positioning of circuit components such as transistors or capacitors) and routing (connection of the components by multiple conductors) occurs, and the selection of cells from a library to enable specific logic functions. As used herein, the term 'cell' signifies a set of transistors, other components, and interconnections that provides a Boolean logic function (e.g., AND, OR, NOT, XOR) or a storage function (such as a flipflop or latch). As used herein, a circuit 'block' comprises two or more cells. Both a cell and a circuit block can be referred to as a module, and are enabled as both physical structures and in simulations. Parameters are specified for selected cells (based on 'standard cells') such as size, and made accessible in a database for use by EDA products. Examples of databases that can be used for accessing cells include MySQL and PostgreSQL. Exemplary EDA products from Synopsys that enable layout implementation 724 include: the Astro and IC Compiler products.

During analysis and extraction 1326, the circuit function is verified at the layout level, which permits refinement of the layout design. Exemplary EDA products from Synopsys that enable analysis and extraction 726 include: the Astrorail, Primerail, Primetime, and Star RC/XT products.

During physical verification 1328, the layout design is checked to ensure that manufacturing constraints are correct, such as DRC constraints, electrical constraints, lithographic constraints, and that circuitry function matches the HDL design specification. Exemplary EDA products from Synopsys that enable physical verification 1328 include: the Hercules product.

During resolution enhancement 1330, the geometry of the layout is transformed to improve how the design is manufactured. Exemplary EDA products from Synopsys that enable resolution enhancement 1330 include: the Proteus product.

During tape-out, data is created to be used (after lithographic enhancements are applied if appropriate) for production of lithography masks. Example EDA products from Synopsys that enable tape-out include: the IC Compiler and Custom Designer products.

During mask-data preparation 1332, the 'tape-out' data is used to produce lithography masks that are used to produce finished integrated circuits. Exemplary EDA products from Synopsys that enable mask-data preparation 1332 include: the CATS family of products.

For all of the abovementioned EDA products, similar products from other EDA vendors, such as Cadence, Siemens, other corporate entities or various non-commercial products from universities, or open source repositories, can be used as an alternative.

A storage subsystem of a computer system (such as computer system 610 of FIG. 6A) is preferably used to store the programs and data structures that are used by some or all of the EDA products described herein, and products used for development of cells for the library and for physical and logical design that use the library.

Detailed Description—Semantic Support

The signifier 'commercial solution' signifies, solely for the following paragraph, an engineering domain-specific (and thus non-preemptive—see Bilski): electronic structure, a process for a specified machine, a manufacturable circuit (and their Church-Turing equivalents) or a composition of matter that applies science and/or technology for use in commerce to solve a technical problem.

The signifier 'abstract' (when used in a patent claim for any enabled embodiments disclosed herein for a new commercial solution that is a scientific use of one or more laws of nature {see Benson}, and that solves a problem of technology {see Diehr} for use in commerce—or improves upon an existing solution used in commerce {see Diehr})—is precisely defined by the inventor(s) {see MPEP 2111.01 ($9^{th}$ edition, Rev. 08.2017)} as follows:

a) a new commercial solution is 'abstract' if it is not novel (e.g., it is so well known in equal prior art {see Alice} and/or the use of equivalent prior art solutions is long prevalent {see Bilski} in science, engineering or commerce), and thus unpatentable under 35 U.S.C. 102, for example, because it is 'difficult to understand' {see Merriam-Webster definition for 'abstract'} how the commercial solution differs from equivalent prior art solutions; or b) a new commercial solution is 'abstract' if the existing prior art includes at least one analogous prior art solution {see KSR}, or the existing prior art includes at least two prior art publications that can be combined {see Alice} by a skilled person {often referred to as a 'PHOSITA', see MPEP 2141-2144 ($9^{th}$ edition, Rev. 08.2017)} to be equivalent to the new commercial solution, and is thus unpatentable under 35 U.S.C. 103, for example, because it is 'difficult to understand' how the new commercial solution differs from a PHOSITA-combination/application of the existing prior art; or c) a new commercial solution is 'abstract' if it is not disclosed with a description that enables its praxis, either because insufficient guidance exists in the description, or because only a generic implementation is described {see Mayo} with unspecified components, parameters or functionality, so that a PHOSITA is unable to instantiate an embodiment of the new solution for use in commerce, without, for example, requiring special programming {see Katz} (or, e.g., circuit design) to be performed by the PHOSITA, and is thus unpatentable under 35 U.S.C. 112, for example, because it is 'difficult to understand' how to use in commerce any embodiment of the new commercial solution.

Detailed Description—Definitions

As used herein, the semiotic function RUD(t,p1,p2, . . . ) signifies that a skilled person can obtain, if needed for progressing the useful arts, a reasonably useful definition of the signifier 't' that comprises the union of definitions of 't' in one or more U.S. Patents and U.S. Patent Applications 'p1', 'p2', etc. For example, 'RUD(substantially, 9532624)' signifies that a skilled person can obtain a reasonably useful definition of 'substantially' as it is defined in U.S. Pat. No. 9,532,624.

DEFINITIONS: RUD(substantially, 9532624).

Detailed Description—Conclusion

The Detailed Description signifies in isolation the individual features, structures, functions, or characteristics described herein and any combination of two or more such features, structures, functions or characteristics, to the extent that such features, structures, functions or characteristics or combinations thereof are enabled by the Detailed Description as a whole in light of the knowledge and understanding of a skilled person, irrespective of whether such features, structures, functions or characteristics, or combinations thereof, solve any problems disclosed herein, and without limitation to the scope of the Claims of the patent. When an embodiment of a claimed invention comprises a particular feature, structure, function or characteristic, it is within the knowledge and understanding of a skilled person to use such feature, structure, function, or characteristic in connection with other embodiments whether or not explicitly described, for example, as a substitute for another feature, structure, function or characteristic.

In view of the Detailed Description, a skilled person will understand that many variations of the claimed inventions can be enabled, such as function and structure of elements, described herein while remaining in the domain of the claimed inventions. One or more elements of an embodiment can be substituted for one or more elements in another embodiment, as will be understood by a skilled person. Writings about embodiments signify their uses in commerce, thereby enabling other skilled people to similarly use in commerce.

This Detailed Description is fitly written to provide knowledge and understanding. It is neither exhaustive nor limiting of the precise structures described, but is to be accorded the widest scope consistent with the disclosed principles and features. A skilled person can enable many equivalent variations. Without limitation, any and all equivalents described, signified or Incorporated by Reference in this patent application are specifically Incorporated by Reference into the Detailed Description. In addition, any and all variations described, signified or Incorporated By Reference with respect to any one claimed invention and its embodiment also are included with all other claimed inventions and their embodiments. Any such variations include both currently known variations as well as future variations, for example any element used for enablement includes a future equivalent element that provides the same function, regardless of the structure of the future equivalent element.

It is intended that the domain of the set of claimed inventions and their embodiments be defined and judged by the following Claims and their equivalents. The Detailed Description includes the following Claims, with each Claim standing on its own as a separate claimed invention. The embodiments of the claimed inventions can have more structure and features than are explicitly specified in the claims.

What is claimed:

1. A computerized system, comprising:
   a memory configured to store operations; and
   one or more processors configured to perform the operations, the operations comprising:
      sorting a subset of a plurality of endpoints for communication during a communication frame, wherein the subset of the plurality of endpoints are sorted based on a value of service interval assigned to each endpoint of the subset of the plurality of endpoints, wherein the plurality of endpoints comprise one or more endpoints of a first peripheral device and one or more endpoints of a second peripheral device,
      re-sorting the sorted subset of the plurality of endpoints based on a concurrency score of the first peripheral device with the second peripheral device,
      determining available bandwidth for communication with the each endpoint of the subset of the plurality of endpoints,
      based on the determined available bandwidth, determining a number of packets to be communicated with the each endpoint of the subset of the plurality of endpoints, and
      generating a scheduling table for communicating the number of packets with the each endpoint of the subset of the plurality of endpoints based on the concurrency score of the first peripheral device with the second peripheral device,
      wherein the generated scheduling table comprises the number of packets to be communicated with the each endpoint of the subset of the plurality of endpoints and an order of communication of the number of packets to be communicated with the each endpoint of the subset of the plurality of endpoints.

2. The computerized system of claim 1, wherein the operations further comprise:
   identifying one or more bus bandwidth domains and one or more buses between a host device and the first peripheral device and the host device and the second peripheral device;
   ordering the one or more bus bandwidth domains between the host device and the first peripheral device and the host device and the second peripheral device based on proximity of the one or more bus bandwidth domains from the host device; and
   comparing the ordered one or more bus bandwidth domains between the host device and the first peripheral device with the ordered one or more bus bandwidth domains between the host device and the second peripheral device to determine the concurrency score of the first peripheral device with the second peripheral device.

3. The computerized system of claim 2, wherein the ordered one or more bus bandwidth domains form n-tuple of bandwidth domains.

4. The computerized system of claim 3, wherein n represents a total number of unique data speeds.

5. The computerized system of claim 2, wherein for the comparing the ordered one or more bus bandwidth domains, the operations further comprise:
comparing each element of a first n-tuple of bandwidth domains between the host device and the first peripheral device with a similarly indexed element of a second n-tuple of bandwidth domains between the host device and the second peripheral device; and
in response to the comparing each element showing at least one compared element of the first n-tuple of bandwidth domains with the similarly indexed element of the second n-tuple of bandwidth domains being different, determining the concurrency score of the first peripheral device with the second peripheral device indicating the first peripheral device and the second peripheral device can be concurrently served.

6. The computerized system of claim 2, wherein for the comparing the ordered one or more bus bandwidth domains, the operations further comprise:
comparing each element of a first n-tuple of bandwidth domains between the host device and the first peripheral device with a similarly indexed element of a second n-tuple of bandwidth domains between the host device and the second peripheral device;
in response to the comparing each element showing the compared element of the first n-tuple of bandwidth domains with the similarly indexed element of the second n-tuple of bandwidth domains being different, generating a weighted sub-score for the compared element of the first n-tuple of bandwidth domain; and
generating the concurrency score of the first peripheral device with the second peripheral device based on the weighted sub-score for the compared element of the first n-tuple of bandwidth domains with the similarly indexed element of the second n-tuple of bandwidth domains being different.

7. The computerized system of claim 6, wherein the generated concurrency score is a first preconfigured value, a second preconfigured value, or a value in between the first preconfigured value and the second preconfigured value, wherein the first preconfigured value is smaller than the second preconfigured value, and wherein the generated concurrency score above a preconfigured threshold value indicates the first peripheral device and the second peripheral device can be concurrently served.

8. The computerized system of claim 1, wherein for the determining the available bandwidth, the operations further comprise:
determining required bandwidth for communicating a plurality of packets based on a transmission speed translation factor between a bandwidth domain of a host device and a bandwidth domain of the first peripheral device,
wherein the transmission speed translation factor is determined by dividing a larger speed of the bandwidth domain of the host device or the peripheral device by a smaller speed of the bandwidth domain of the host device or the first peripheral device.

9. The computerized system of claim 8, wherein for the determining the available bandwidth, the operations further comprise:
determining used bandwidth for communicating the plurality of packets based on transmission speed translation factors of one or more bandwidth domains between the host device and the first peripheral device; and
determining a difference of the required bandwidth and the used bandwidth as the available bandwidth.

10. A method, comprising:
sorting a subset of a plurality of endpoints for communication during a communication frame, wherein the subset of the plurality of endpoints are sorted based on a value of service interval assigned to each endpoint of the subset of the plurality of endpoints, wherein the plurality of endpoints comprise one or more endpoints of a first peripheral device and one or more endpoints of a second peripheral device;
re-sorting the sorted subset of the plurality of endpoints based on a concurrency score of the first peripheral device with the second peripheral device;
determining available bandwidth for communication with the each endpoint of the subset of the plurality of endpoints;
based on the determined available bandwidth, determining a number of packets to be communicated with the each endpoint of the subset of the plurality of endpoints; and
generating a scheduling table for communicating the number of packets with the each endpoint of the subset of the plurality of endpoints based on the concurrency score of the first peripheral device with the second peripheral device,
wherein the generated scheduling table comprises the number of packets to be communicated with the each endpoint of the subset of the plurality of endpoints and an order of communication of the number of packets to be communicated with the each endpoint of the subset of the plurality of endpoints.

11. The method of claim 10, further comprising:
identifying one or more bus bandwidth domains and one or more buses between a host device and the first peripheral device and the host device and the second peripheral device;
ordering the one or more bus bandwidth domains between the host device and the first peripheral device and the host device and the second peripheral device based on proximity of the one or more bus bandwidth domains from the host device; and
comparing the ordered one or more bus bandwidth domains between the host device and the first peripheral device with the ordered one or more bus bandwidth domains between the host device and the second peripheral device to determine the concurrency score of the first peripheral device with the second peripheral device.

12. The method of claim 11, wherein the ordered one or more bus bandwidth domains form n-tuple of bandwidth domains.

13. The method of claim 12, wherein n represents a total number of unique data speeds.

14. The method of claim 11, wherein the comparing the ordered one or more bus bandwidth domains comprises:
comparing each element of a first n-tuple of bandwidth domains between the host device and the first peripheral device with a similarly indexed element of a second n-tuple of bandwidth domains between the host device and the second peripheral device; and in response to the comparing each element showing at least one compared element of the first n-tuple of bandwidth domains with the similarly indexed element of the second n-tuple of bandwidth domains being different, determining the concurrency score of the first peripheral device with the second peripheral device indicating the first peripheral device and the second peripheral device can be concurrently served.

15. The method of claim 11, wherein the comparing the ordered one or more bus bandwidth domains comprises:

comparing each element of a first n-tuple of bandwidth domains between the host device and the first peripheral device with a similarly indexed element of a second n-tuple of bandwidth domains between the host device and the second peripheral device;

in response to the comparing each element showing the compared element of the first n-tuple of bandwidth domains with the similarly indexed element of the second n-tuple of bandwidth domains being different, generating a weighted sub-score for the compared element of the first n-tuple of bandwidth domains; and generating the concurrency score of the first peripheral device with the second peripheral device based on the weighted sub-score for the compared element of the first n-tuple of bandwidth domains with the similarly indexed element of the second n-tuple of bandwidth domains being different.

16. The method of claim 15, wherein the generated concurrency score is a first preconfigured value, a second preconfigured value, or a value in between the first preconfigured value and the second preconfigured value, wherein the first preconfigured value is smaller than the second preconfigured value, and wherein the generated concurrency score above a preconfigured threshold value indicates the first peripheral device and the second peripheral device can be concurrently served.

17. The method of claim 10, wherein the determining the available bandwidth comprises:

determining required bandwidth for communicating a plurality of packets based on a transmission speed translation factor between a bandwidth domain of a host device and a bandwidth domain of the first peripheral device, wherein the transmission speed translation factor is determined by dividing a larger speed of the bandwidth domain of the host device or the peripheral device by a smaller speed of the bandwidth domain of the host device or the first peripheral device.

18. The method of claim 17, wherein the determining the available bandwidth further comprises:

determining used bandwidth for communicating the plurality of packets based on transmission speed translation factors of one or more bandwidth domains between the host device and the first peripheral device; and determining a difference of the required bandwidth and the used bandwidth as the available bandwidth.

19. A non-transitory, tangible computer-readable device having instructions stored thereon that, when executed by at least one computing device, cause the at least one computing device to perform operations comprising:

sorting a subset of a plurality of endpoints for communication during a communication frame, wherein the subset of the plurality of endpoints are sorted based on a value of service interval assigned to each endpoint of the subset of the plurality of endpoints, wherein the plurality of endpoints comprise one or more endpoints of a first peripheral device and one or more endpoints of a second peripheral device;

re-sorting the sorted subset of the plurality of endpoints based on a concurrency score of the first peripheral device with the second peripheral device;

determining available bandwidth for communication with the each endpoint of the subset of the plurality of endpoints;

based on the determined available bandwidth, determining a number of packets to be communicated with the each endpoint of the subset of the plurality of endpoints; and generating a scheduling table for communicating the number of packets with the each endpoint of the subset of the plurality of endpoints based on the concurrency score of the first peripheral device with the second peripheral device.

20. The non-transitory, tangible computer-readable device of claim 19, wherein the generated scheduling table comprises the number of packets to be communicated with the each endpoint of the subset of the plurality of endpoints and an order of communication of the number of packets to be communicated with the each endpoint of the subset of the plurality of endpoints.

* * * * *